United States Patent [19]

Slysh

[11] 4,334,816
[45] Jun. 15, 1982

[54] DEVICE AND METHOD FOR ASSEMBLING LARGE SPACE STRUCTURES

[75] Inventor: Paul Slysh, San Diego, Calif.

[73] Assignee: General Dynamics Corporation, San Diego, Calif.

[21] Appl. No.: 930,823

[22] Filed: Aug. 3, 1978

[51] Int. Cl.³ .............................................. B64G 4/00
[52] U.S. Cl. ...................................... 414/10; 29/431; 104/287; 244/159; 414/718; 414/735
[58] Field of Search ........................ 414/1, 4, 5, 7, 10, 414/718, 729, 732, 735, 787; 105/31, 32; 104/287; 180/8 R; 244/158, 159; 254/37, 106; 29/429, 431, 779; 52/108, 749

[56] References Cited

U.S. PATENT DOCUMENTS

| | | | |
|---|---|---|---|
| Re. 28,437 | 6/1975 | Devol et al. ................... | 414/735 X |
| 3,369,670 | 2/1968 | Le Tourneau .................. | 414/718 X |
| 3,821,934 | 7/1974 | Maeda ............................. | 104/287 |

FOREIGN PATENT DOCUMENTS 580170 7/1959 Canada ................................ 105/31

Primary Examiner—Leslie J. Paperner
Attorney, Agent, or Firm—John R. Duncan; Hugo F. Mohrlock

[57] ABSTRACT

An automated assembly, maintenance, and repair system for the construction of a large space structure. The space structure comprises a plurality of trusses and truss junctions that in turn are made up of a plurality of individual struts and nodes. The truss assemblies are progressively built by an assembler trolley as the trolley crawls along the constructed truss. The trolley comprises a forward crawler and a rear crawler joined by an articulated coupler. The crawlers are carried along the structure by belt transports incorporating grippers that engage the truss structure at the nodes. Manipulator arms for strut and node assembly are located on the forward crawler, and the majority of control, power, and communication systems are located in the rear crawler. Cargo canisters filled with component parts for constructing the space structure are carried by the forward crawler. The space structure configuration is determined by the arrangement of the individual struts and nodes during the assembly process.

19 Claims, 84 Drawing Figures

FIG. 1
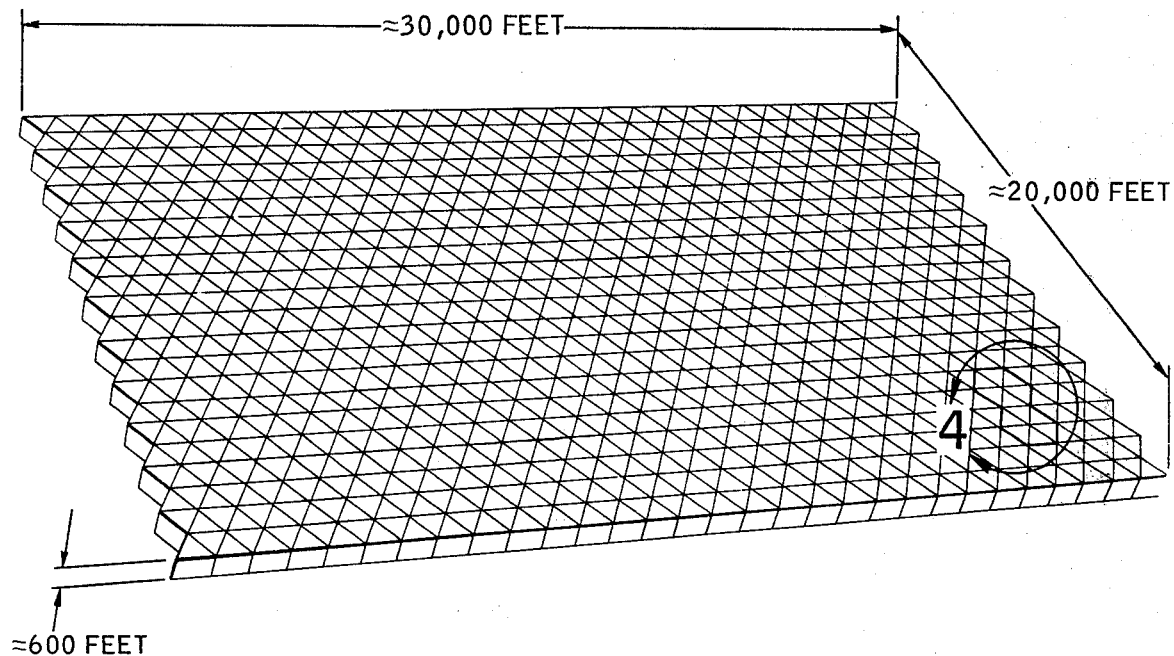
FIG. 2
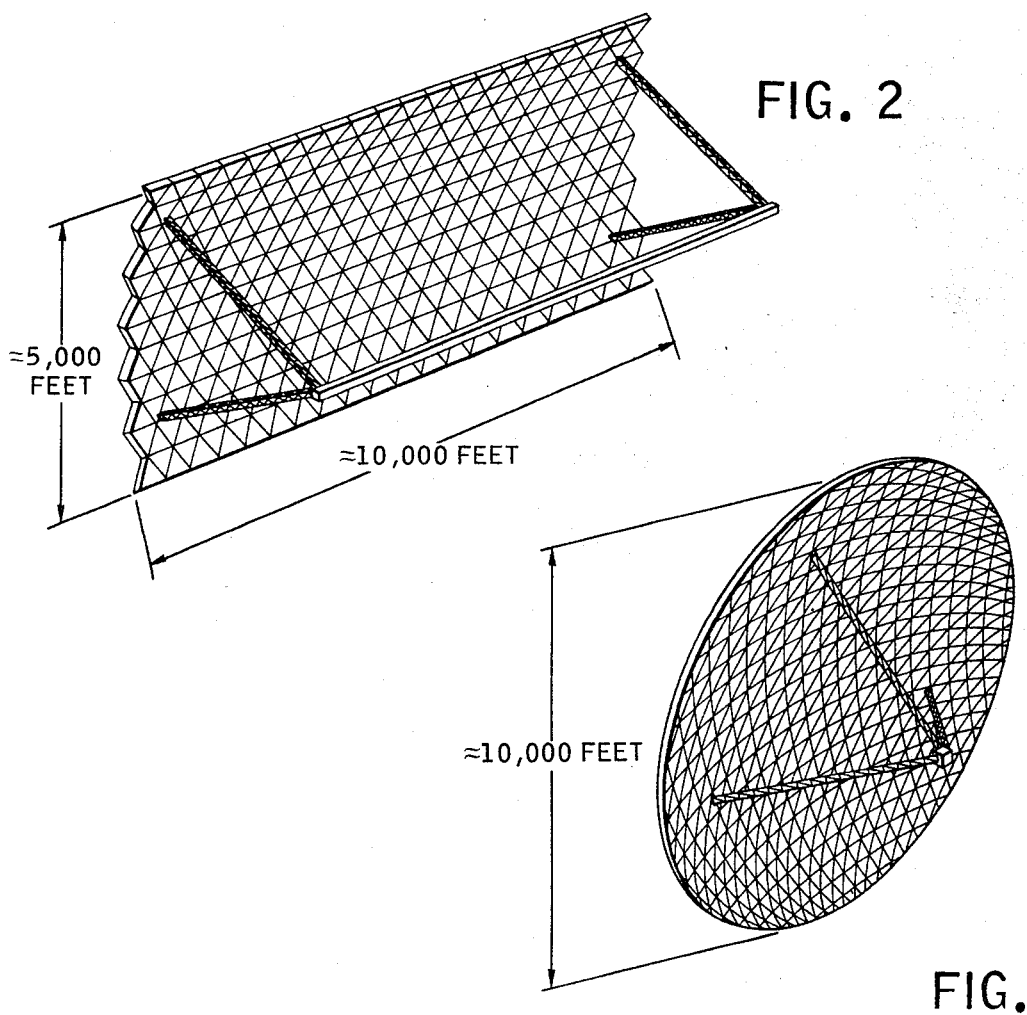
FIG. 3

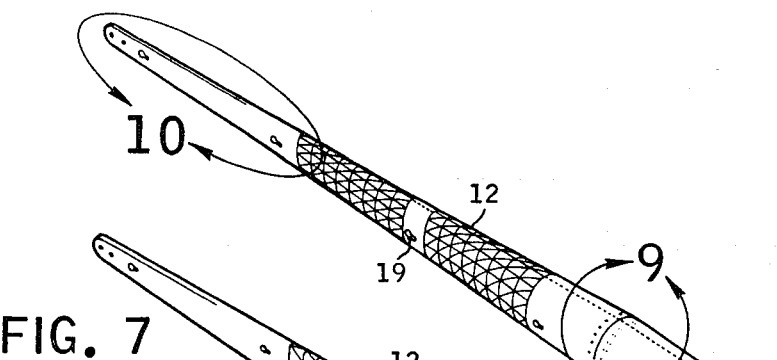
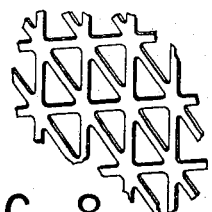
FIG. 7  FIG. 8  FIG. 6
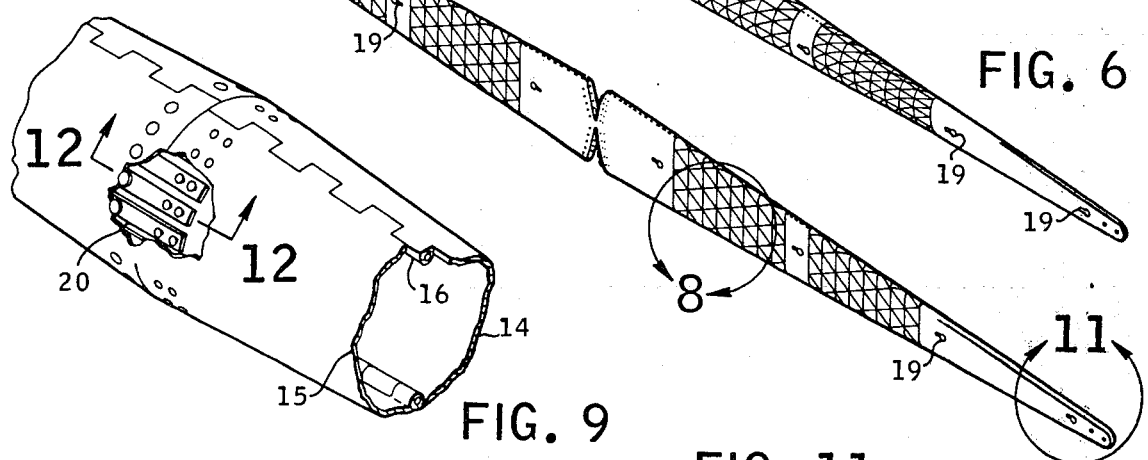
FIG. 9  FIG. 11
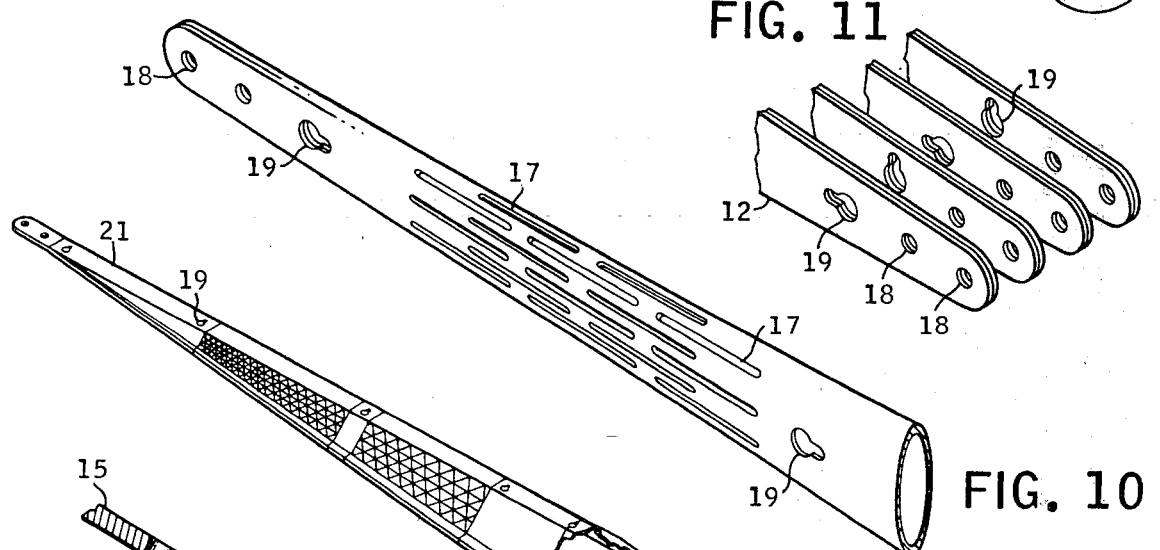
FIG. 10
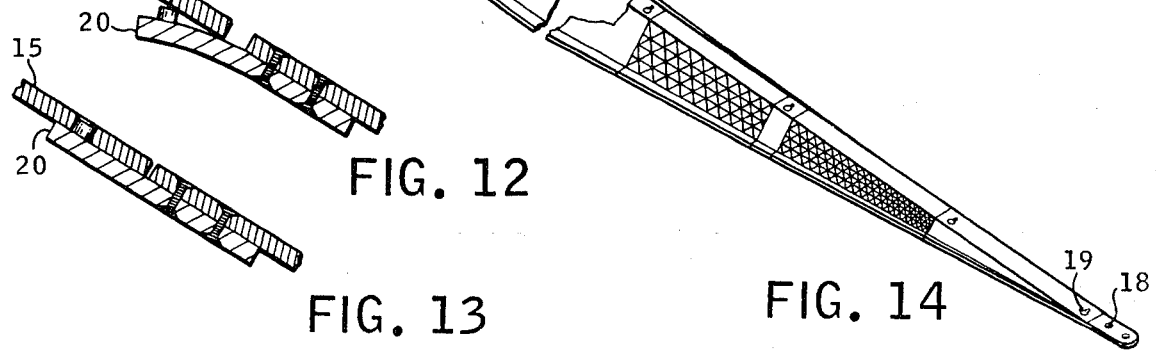
FIG. 13  FIG. 12  FIG. 14

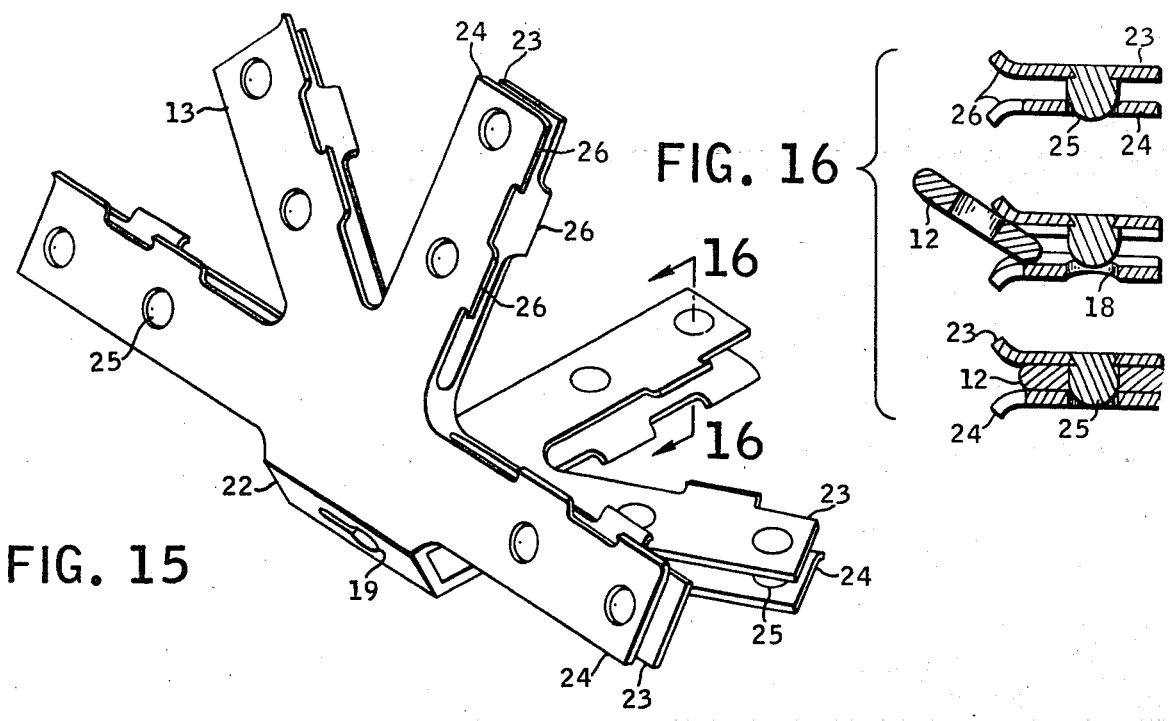
FIG. 15
FIG. 16
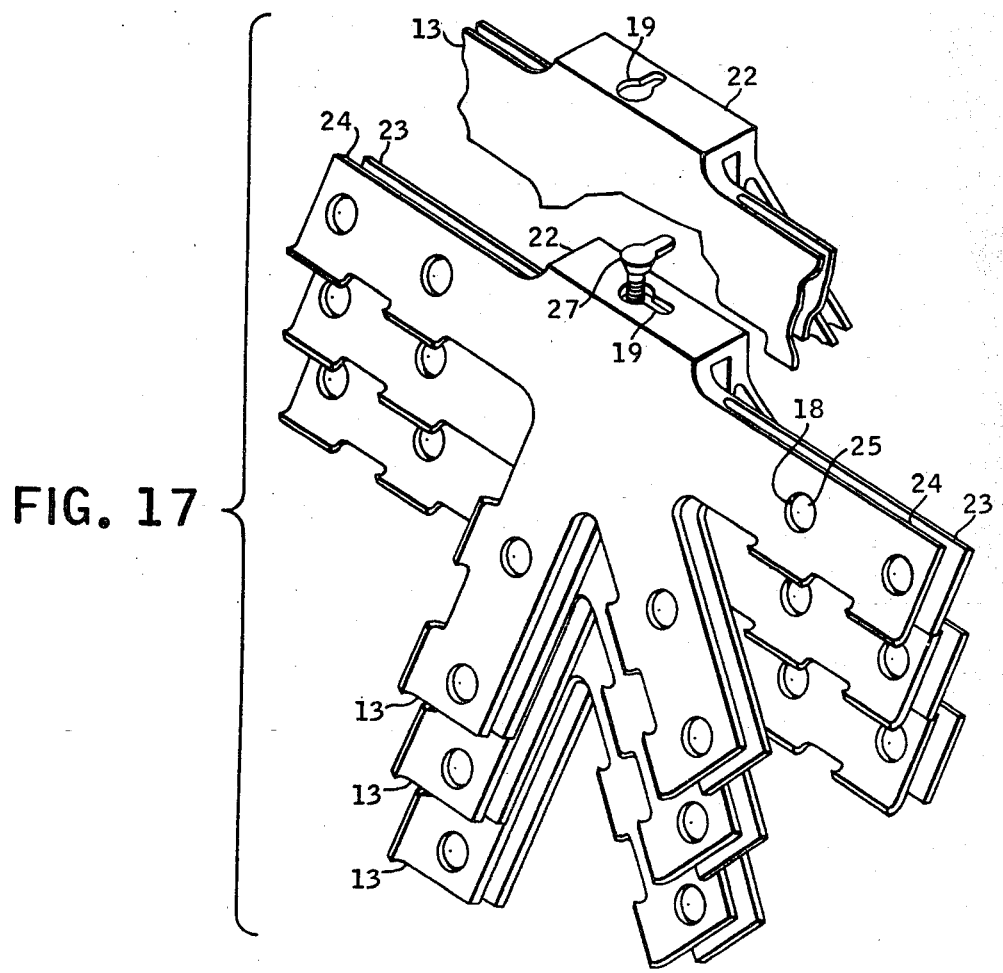
FIG. 17

FIG. 27
FIG. 28
FIG. 29
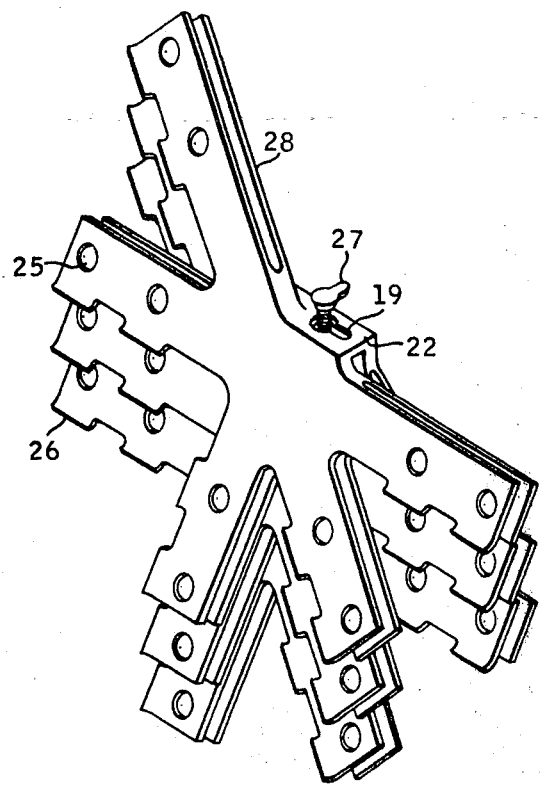
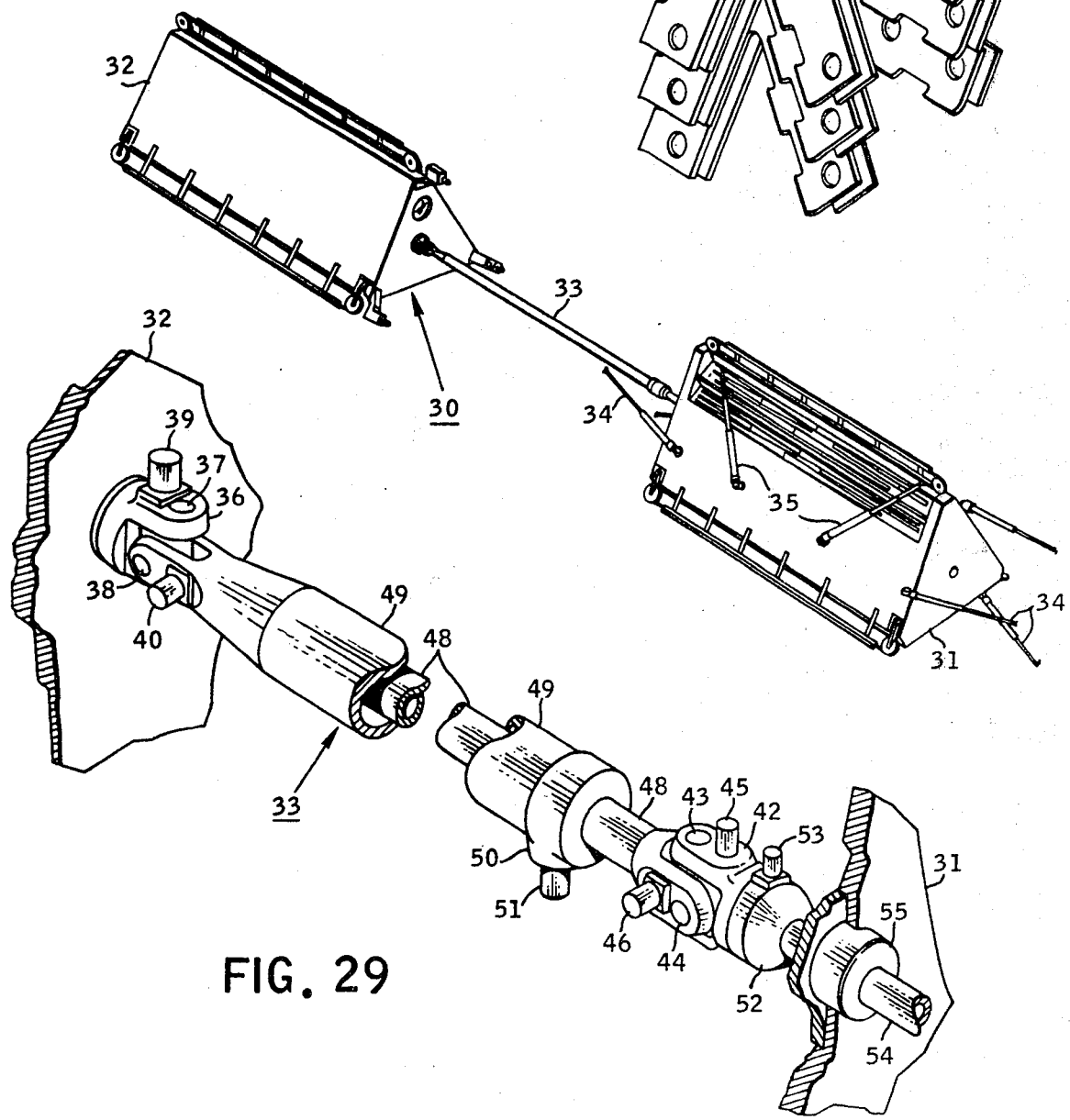

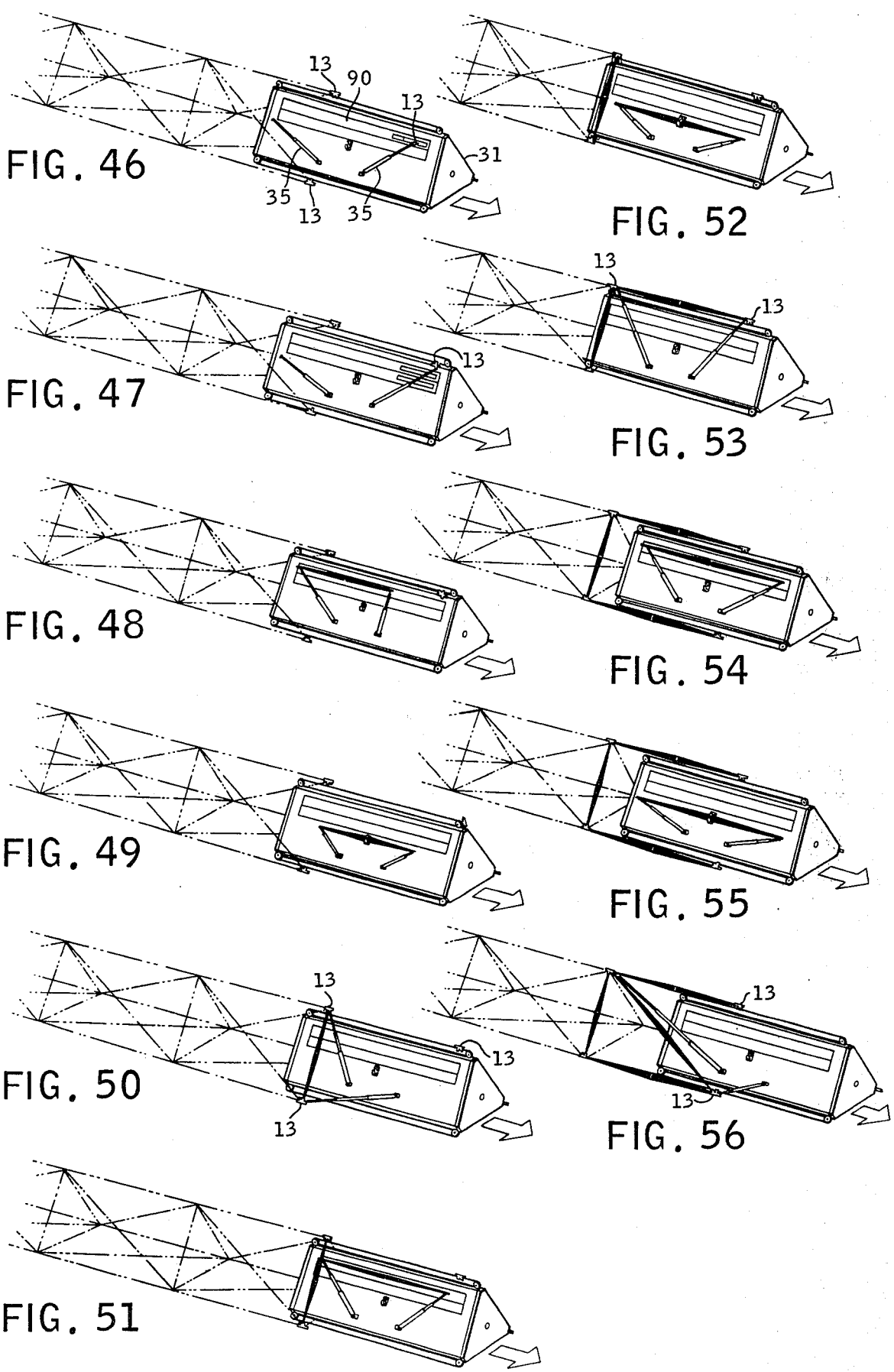

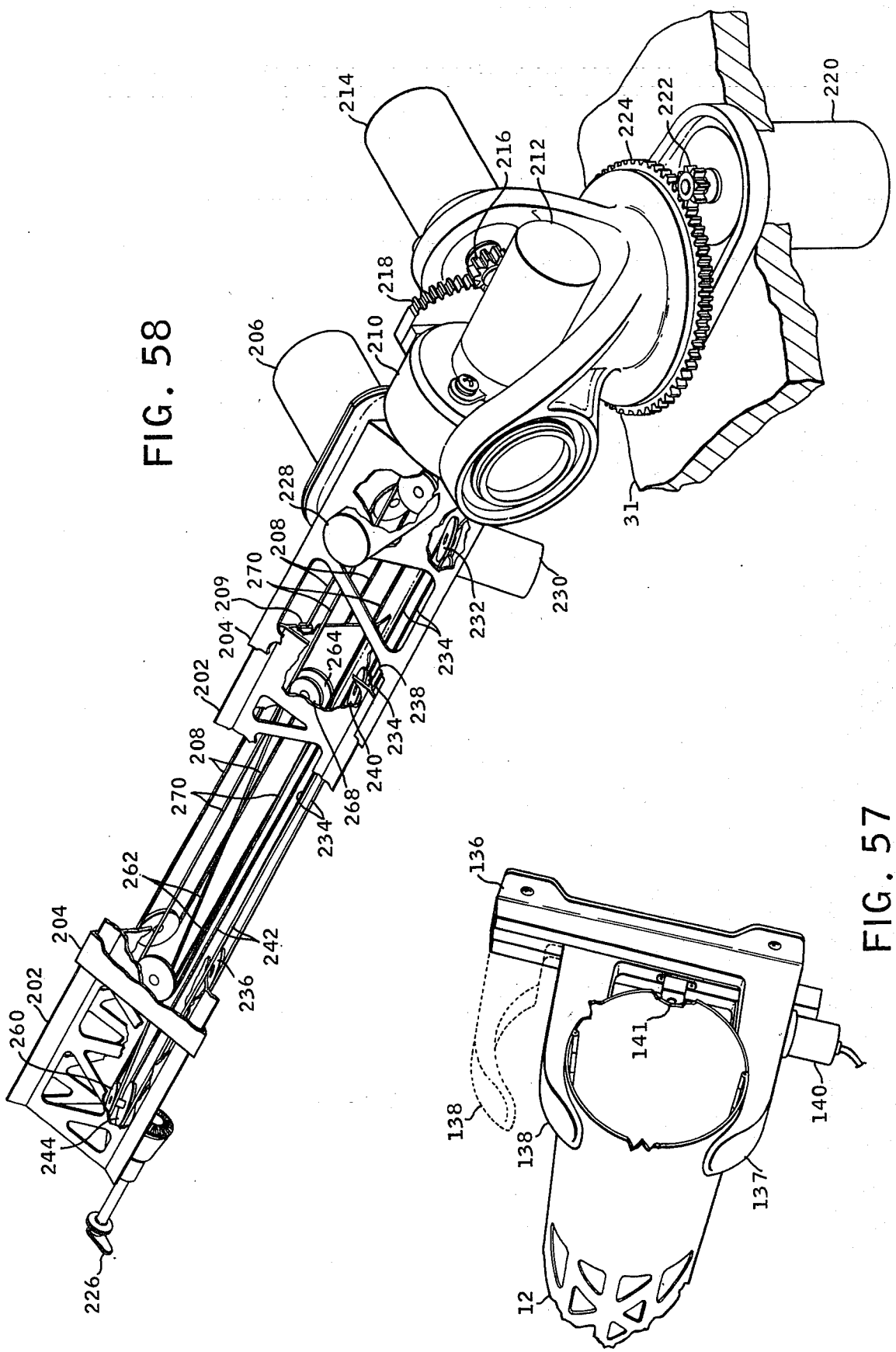

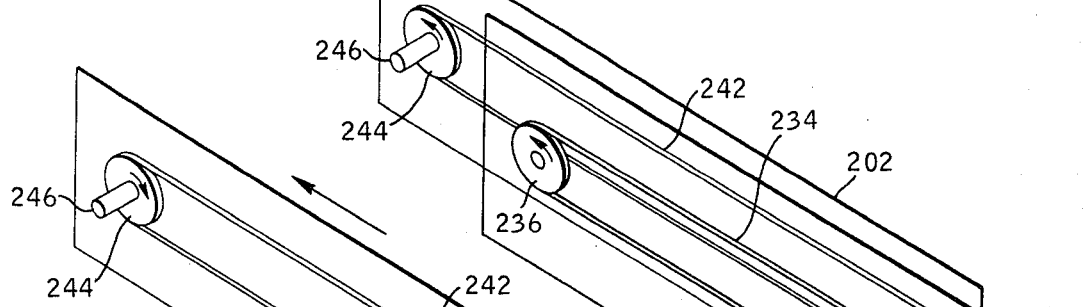
FIG. 59
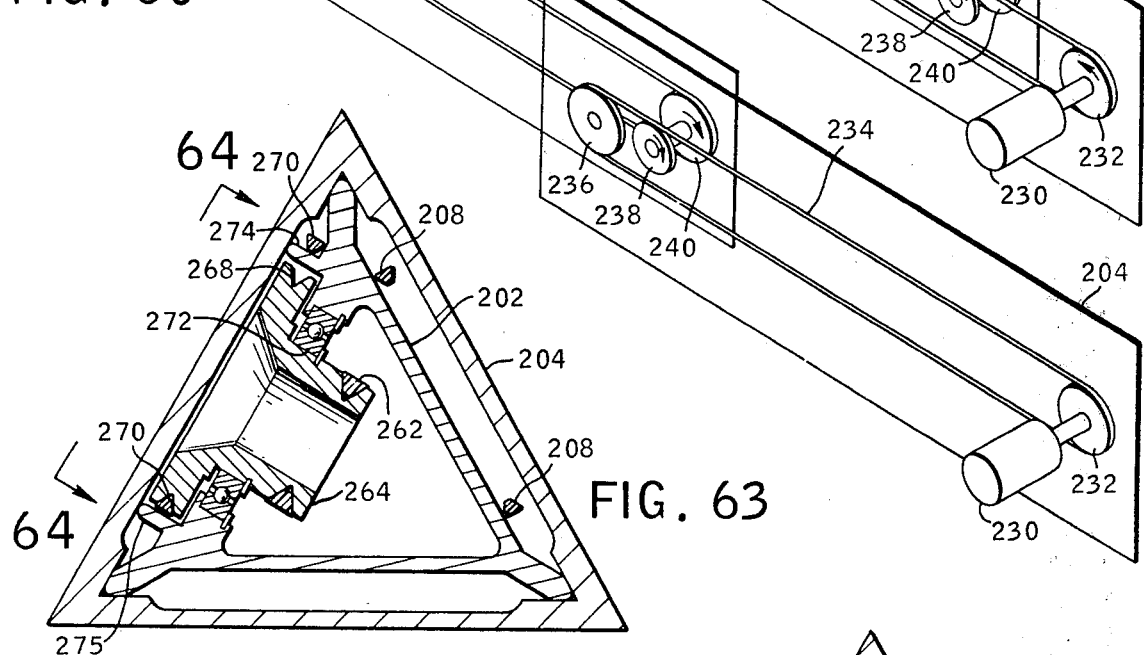
FIG. 60
FIG. 63
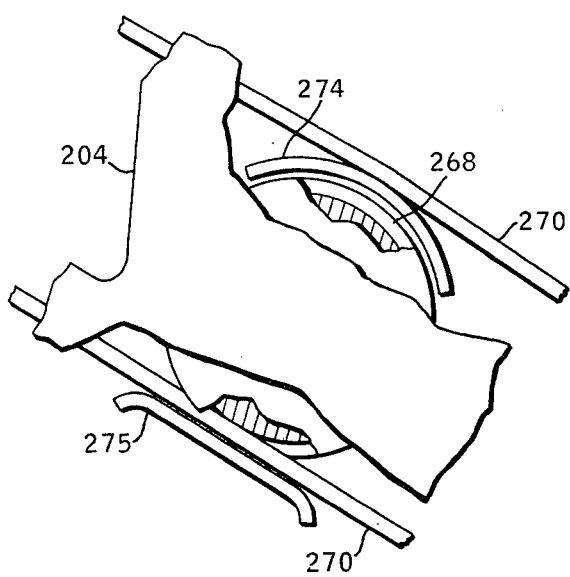
FIG. 64
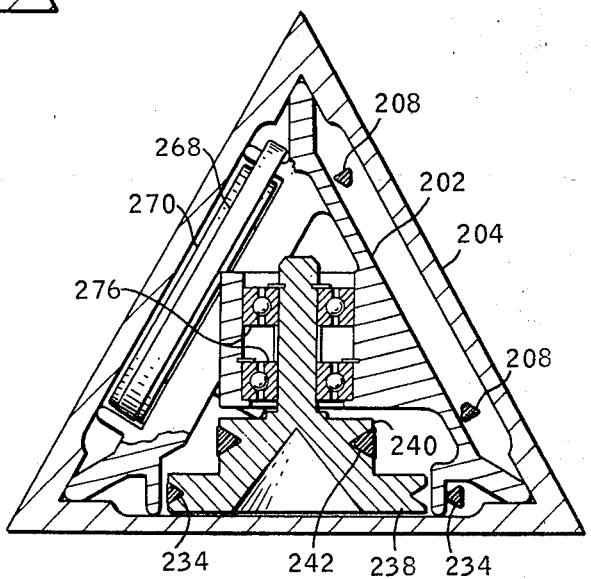
FIG. 65

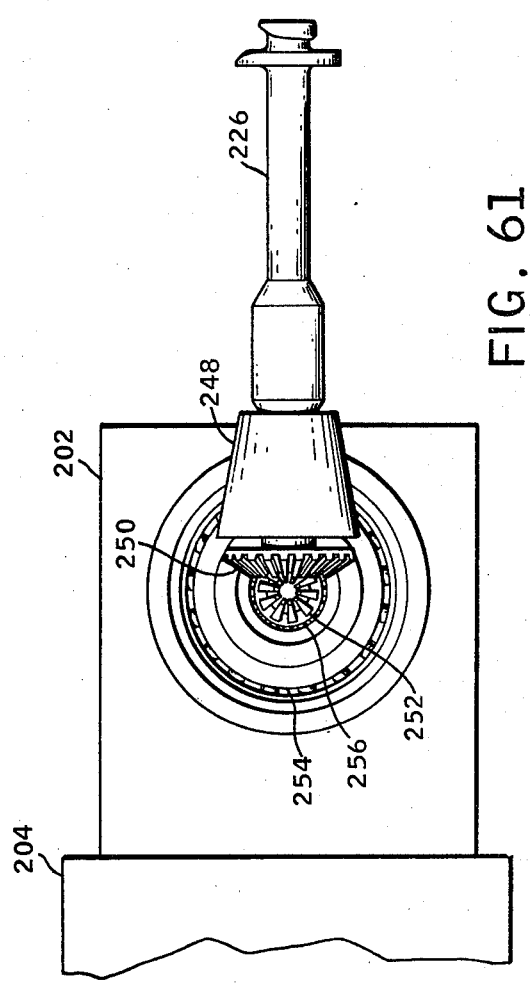
FIG. 61
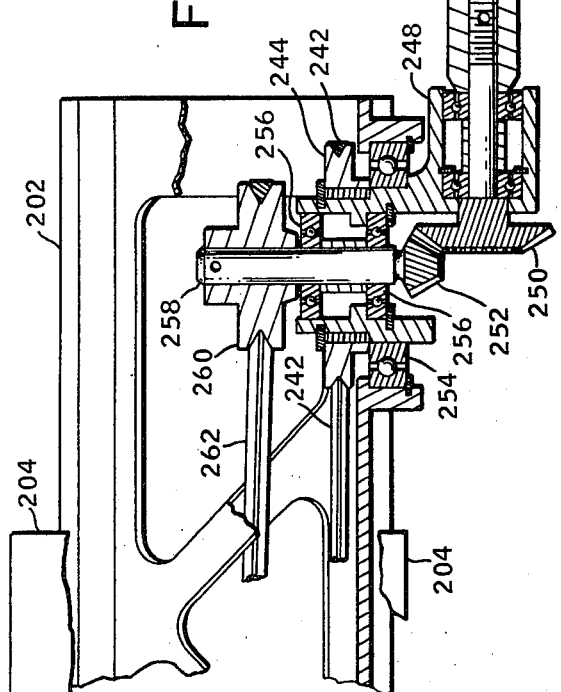
FIG. 62
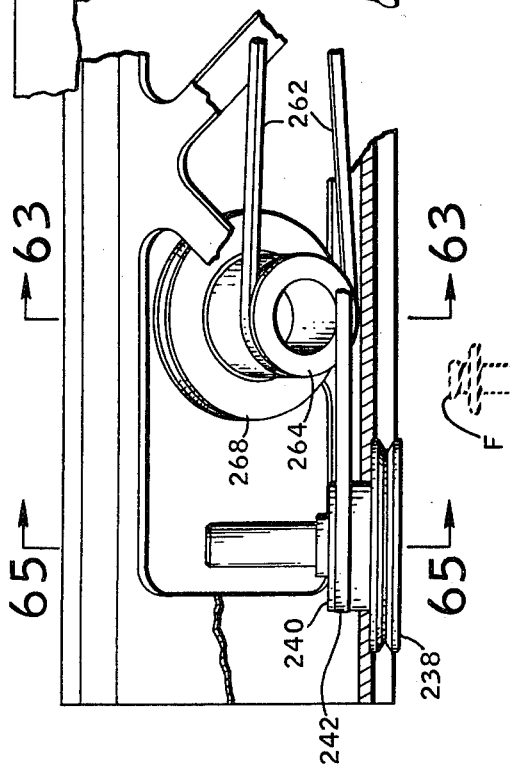
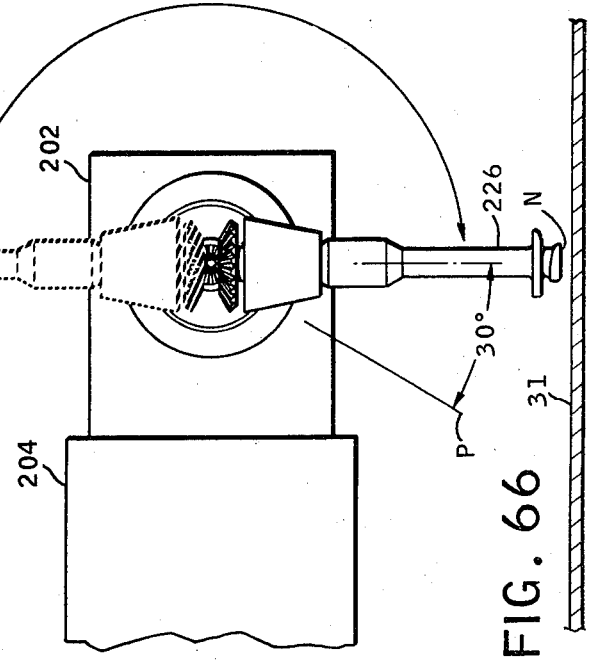
FIG. 66

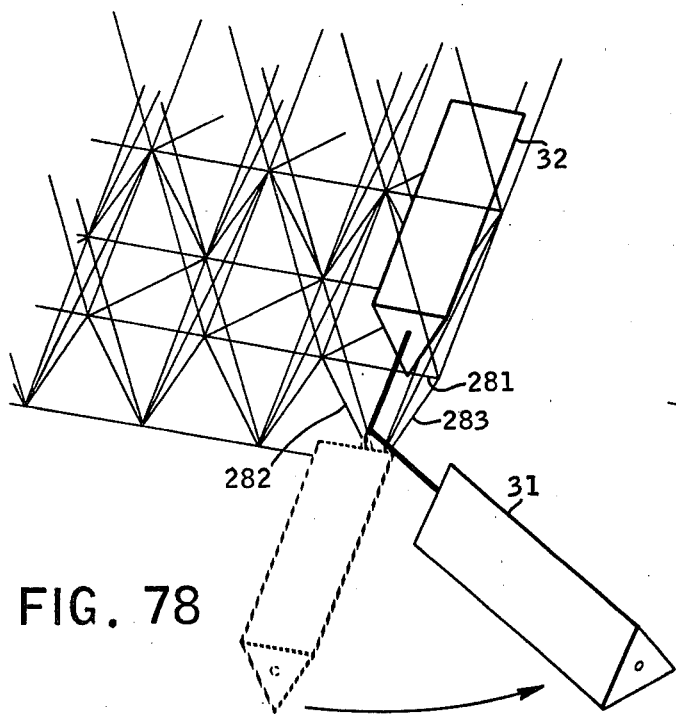
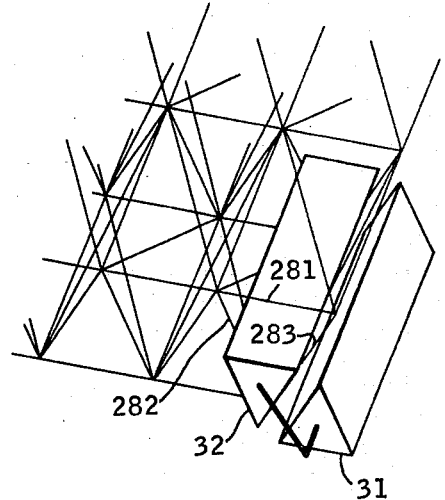
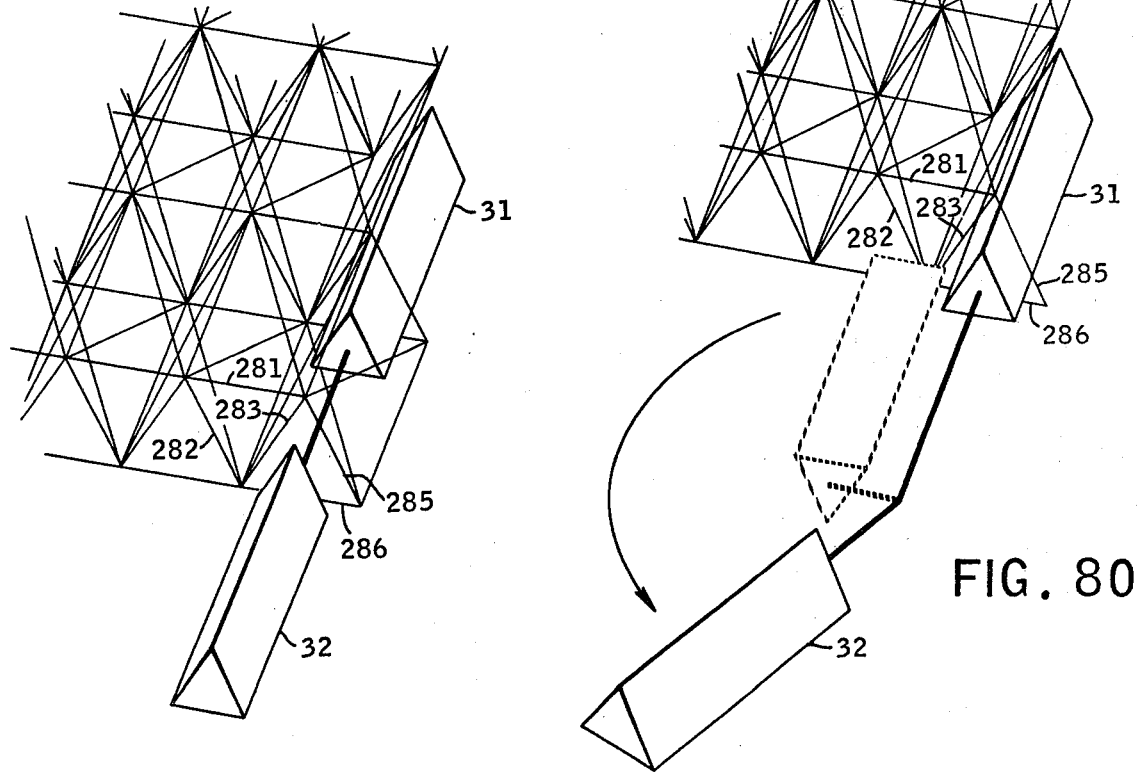
FIG. 78
FIG. 79
FIG. 81
FIG. 80

DEVICE AND METHOD FOR ASSEMBLING LARGE SPACE STRUCTURES

BACKGROUND OF THE INVENTION

Early space structures were fully assembled on earth prior to launching into space, and their size was limited to the cargo volume of the launch vehicle. Subsequent structures comprised ingenious folded, compressed, or rolled high-density assemblies that would unfurl, deploy, or expand upon arriving in space to form structures displacing a volume many times larger than the original stowage volume provided by the launch vehicle.

More sophisticated and complex structures for earth orbit deployment have been developed. Some such structures are to be manufactured in space by roll forming and welding of densely packaged spooled strip stock, usually of aluminum, thermoplastic graphite epoxy, or other composite material. Pulltrusion or rolltrusion forming at elevated temperature is used on the composite materials, and cold roll forming is the usual forming method employed on aluminum.

For structures of increased size, which require volumes of material beyond the capabilities of these methods to produce, a new technique is required that will utilize the technologies and advantages of these prior assembly and deployment methods and will additionally possess the capabilities to produce structures vastly larger in size. Such a technique must be highly mechanized and automated to have the performance and cost effectiveness required of it.

SUMMARY OF THE INVENTION

The present invention is an automated assembly, operation, maintenance, and repair system for a large space structure using programmed, computer-controlled, man-supervised automated equipment. The space structure comprises a plurality of trusses and truss junctions, each truss being made up of a plurality of individual struts and nodes. The truss assemblies are progressively built by an assembler trolley as the trolley crawls along the constructed truss.

The trolley comprises a forward crawler and a rear crawler joined by an articulated coupler. The crawlers are carried along the structure by belt transports incorporating grippers that engage the truss structure at the nodes.

Manipulator arms for strut and node assembly are located on the forward crawler, and the majority of control, power, and communication systems are located in the rear crawler. Cargo canisters filled with component parts for constructing the space structure are carried by the forward crawler. The space structure configuration is determined by the arrangement of the individual struts and nodes during the assembly process.

The rear crawler may also contain a man support system so that crewmen may come aboard to assist in the construction or make necessary repairs. It may also carry spare struts, nodes, and manipulator arms which, if required, are removed and installed by the manipulator arms on the forward crawler of a companion trolley.

The size of the structure to be fabricated in space is unlimited, since the trolley is capable of accepting the resupply of structural component parts from an orbiting cargo vehicle which may shuttle back and forth from earth to orbit.

The space structure will provide for the mounting of solar array blankets, solar or microwave reflector surfaces, focal point support structures and bolt-on components as for example, attitude control system, scientific instruments, and various electronic communication, computation, and control devices.

It is an object of the invention to provide synergistically compatible structures and an autonomous, self-regulating assembler device that may be monitored, supervised, and when necessary operationally modified by remote sensing and control.

It is an object of the invention to provide structural truss-frame arrangements that permit the assembler trolley to both assemble the structure and then have access to any part of the structure to deliver and attach add-on components or to dismantle, modify, or repair the structure.

It is an object of the invention to provide a lightweight structure, wherein reaction loads from the assembler trolley are reacted only at specific hard points for efficient distribution into the structure.

Another object of the invention is to provide a method for assembling the structure while the trolley is moving at a constant rate such the inertia loads imposed on the assembled structure during the manipulation of components are held below the design limits of the structure.

Another object of the invention is to provide autonomous and remotely monitored/controlled sensor systems that may stop the motion of the trolley so that corrective procedures may be instituted by pre-programmed and/or man-in-the-loop activities.

Another object of the invention is to provide struts and strut attachment nodes that may be efficiently stowed in and deployed from canisters carried on the assembler trolley, said canisters being capable of replenishment from a cargo vehicle.

Another object of the invention is to provide an assembly device which has significantly reduced power requirements to those required for systems utilizing in-orbit material forming, brazing, or welding.

Another object of the invention is to provide an assembly device which requires no large jigs or fixtures for assembly operations.

It is also an object of the invention to provide struts and strut nodes that are nestable to permit efficient high-density storage in easy to handle canisters.

The above and other objects and advantages of the invention will appear more fully hereinafter from a consideration of the following description taken together with the accompanying drawings, wherein one embodiment of the invention is shown by way of example. It should be understood however, that the drawings are for the purposes of illustration only and are not to be construed as defining or limiting the scope of the invention.

BRIEF DESCRIPTION OF THE DRAWINGS

In the drawings, wherein like reference characters designate like parts throughout the various views:

FIGS. 1, 2, and 3 are perspective views of typical large structures assembled by the disclosed method.

FIG. 6 is a perspective view of an expanded strut.

FIG. 7 is a perspective view of a compressed strut.

FIG. 8 is a partial view of the open isogrid structure of a strut taken substantially at the area indicated by circular section-line 8 in FIG. 7.

FIG. 9 is a partial view of a center portion of the strut taken substantially at the area indicated by circular section-line 9 in FIG. 6.

FIG. 10 is a partial view of the strut oval end taken substantially at the area indicated by circular section-line 10 in FIG. 6.

FIG. 11 is a partial view of the flat end of a strut taken substantially at the area indicated by circular section-line 11 in FIG. 6.

FIG. 12 is a cross section of the center strut area taken substantially from a plane indicated by line 12—12 in FIG. 9 showing the strut partially compressed.

FIG. 13 is a cross section of the strut taken in the same area as FIG. 12 showing the strut in the fully expanded condition.

FIG. 14 is a perspective view of a fixed geometry strut having a hat cross section.

FIG. 15 is a perspective view of a structural nodes positioned as indicated by circular section-line 15 in FIG. 5.

FIG. 16 is a series of cross sections of the node spring legs taken substantially from a plane indicated by line 16—16 in FIG. 15.

FIG. 17 is a view of a stack of structural nodes positioned as indicated by circular section-line 17 in FIG. 5.

FIG. 27 is a perspective view of a structural node used at truss junctions.

FIG. 28 is a perspective view of the assembler trolley.

FIG. 29 is a perspective view of the crawler coupler shaft.

FIGS. 46 through 56 indicate the series sequential steps of the forward crawler assembling a truss structural bay.

FIG. 57 is a perspective view of a strut inspection device.

FIG. 58 is a perspective view of a telescoping triangular truss manipulator arm.

FIGS. 59 and 60 are schematic views of the dog-disc pitch drive belt system.

FIG. 61 is an enlarged view of the bottom surface of the manipulator arm working end showing the dog-disc tool.

FIG. 62 is a partial side view of the manipulator arm and includes a cross-section through the dog-disc tool.

FIG. 63 is a cross-section of the manipulator arm taken substantially from a plane indicated by line 63—63 in FIG. 61.

FIG. 64 is a partial side view of the manipulator arm taken in the area of the cross-section line 64—64 of FIG. 63.

FIG. 65 is a cross-section of the manipulator arm taken substantially from a plane indicated by line 65—65 in FIG. 61.

FIG. 66 is a view of the dog-disc tool in several prime positions.

FIGS. 78 through 81 show the assembly sequence for a platform structure comprising a plurality of side-by-side disposed triangular trusses.

DETAILED DESCRIPTION OF THE INVENTION

Figure 4:
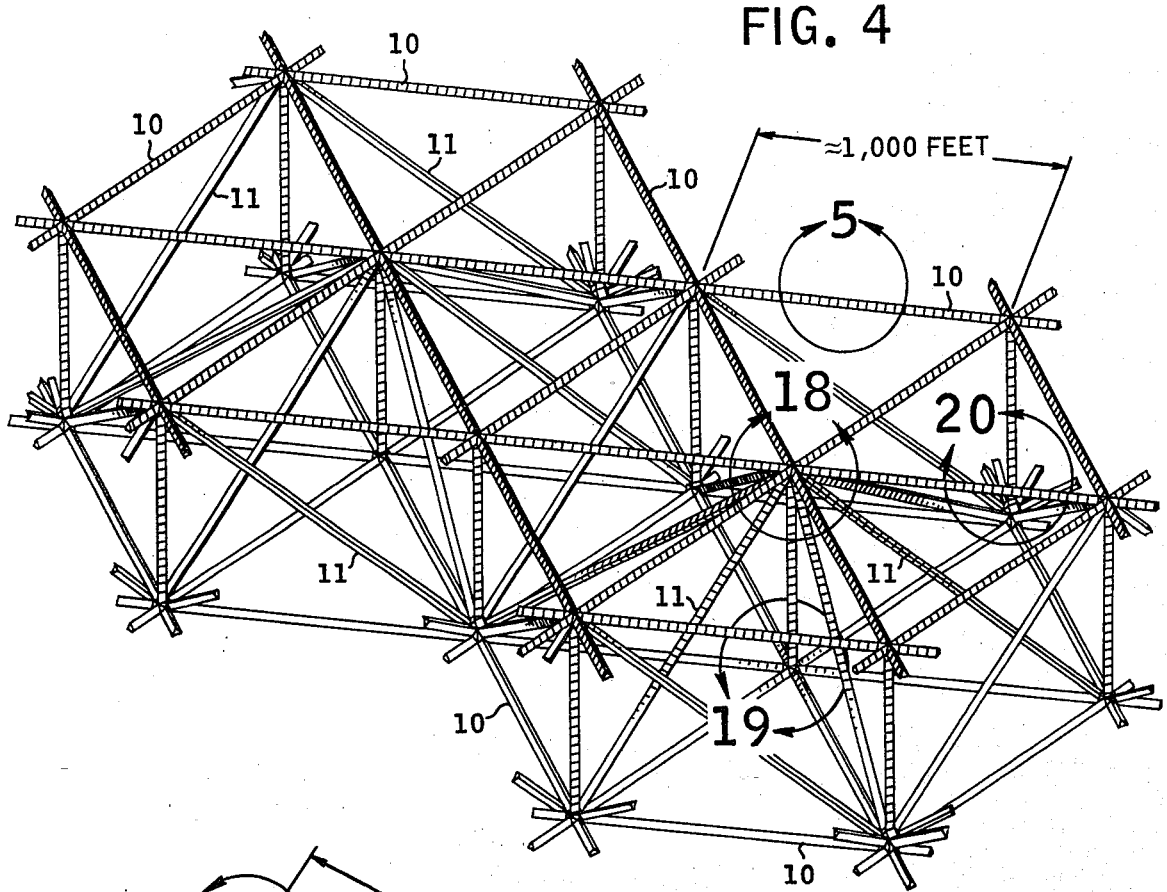
FIG. 4 is an enlarged view of a portion of a structure taken substantially in the area indicated by circular section-line 4 of FIG. 1.

Referring now to the drawings in detail, FIGS. 1, 2, and 3 illustrate respectively a planar space-deployed structure, a cylindrical parabola structure, and a paraboloidal dish structure. In order to appreciate the magnitude of these structures certain basic dimensions are shown by way of example. These structures may cover tens or hundreds of square miles in area, having no counterpart here on earth.

FIG. 4 is an enlarged view of that portion of the planar structure of FIG. 1 shown by view line 4. Again a dimension of the structure is shown by way of example of the magnitude of the structure.

Figure 5:
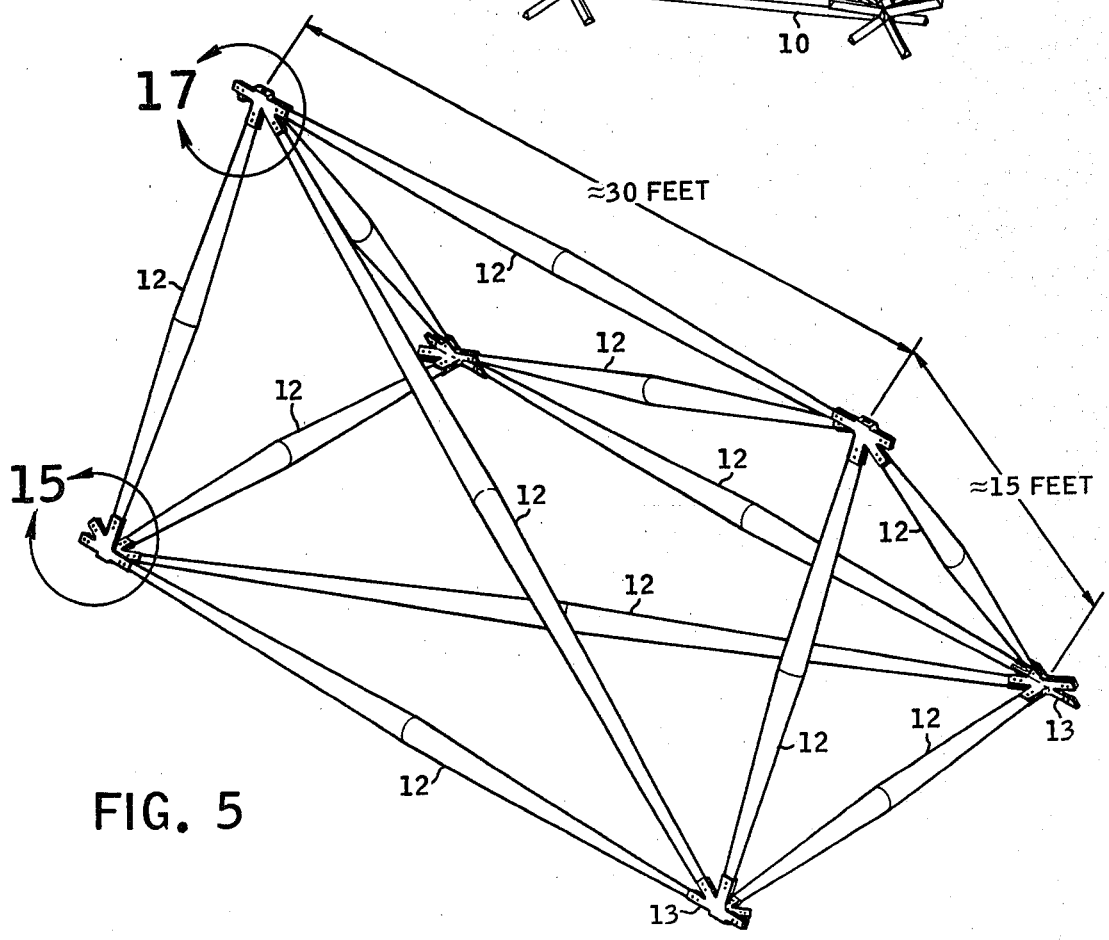
FIG. 5 is an enlarged view of a single structural bay taken substantially at the area indicated by circular section-line 5 of FIG. 4.

FIG. 5 is an enlarged view of that portion of the truss structure of FIG. 4 shown by view line 5. There are again illustrated several structural dimensions, which are only by way of example, so that by comparing FIGS. 1, 4, and 5 one may gain an appreciation and understanding of the relationship of the basic truss to the overall structure.

Referring again to FIG. 4, it is seen that the upper and lower faces of the structure are composed of trusses 10 forming coincident equilateral triangular patterns. These faces are joined by triangulated web trusses 11 to in effect form a space frame isogrid structure. Because of its configuration, and because all members perform equally well in tension and compression, the structure has excellent structural efficiency and stability. This is particularly true with respect to torsional loading, about an axis parallel to the structural plane, as well as bending and in-plane loading. Structures employing guy wire cross members are inherently not as efficient, since the wires contribute to structural strength or stiffness only when loaded in tension.

In FIG. 5 it is seen that the basic truss structure is of a triangular cross section, and is constructed of a plurality of tapered struts 12, each strut having a circular cross section which tapers to a flat section at each end which terminates on nodes 13. Each of the three sides of a truss bay comprises a rectangle bounded by four struts and one diagonal strut. This produces six strut terminatives per node 13, thereby allowing all nodes to be of the same shape and configuration.

FIG. 6 shows a tapered strut 12 in detail. The strut comprises two conic monocoque shells joined at their bases to define a taper in both directions from the mid section. Portions of the shell are relieved and lightened with an open isogrid hole pattern, shown in greater detail in FIG. 8. Each half 14 and 15 of the conic shell is attached together by means of a longitudinal piano hinge 16, shown in greater detail in FIG. 9.

FIG. 7 shows the tapered strut 12 in the flat stowed position. Each conical half shell 14 and 15 (see FIG. 9) is compressed flat for storage, the movement accommodated by a combination of the spring characteristics of the conical shell sections and the piano hinge 16. The shell halves 14 and 15 are extremely light gage material and may be constructed of any suitable metal such as aluminum or stainless steel, or any suitable composite material such as for example, graphite epoxy. The diametrically opposed longitudinal piano hinges 16 and spring action due to pre-forming of the strut material allows the strut to assume the expanded state when released from the stowed condition.

The relatively large diameter at the center of the strut produces low stowed-state stresses and permits a circular cross section to develop when released from the stowed state. Near the ends of the strut the reduced diameter causes higher stowed-state stresses and allows for only an oval cross section in the deployed state, which is more clearly seen in FIG. 10. It is necessary that transitions take place between different cross sections along parts of the strut length. Therefore, the hinges 16 include some small localized end play to eliminate hinge binding during strut expansion. Actually, because of the small departure of the hinge line from a straight line and the available elasticity in the thin gage strut material, the binding action is tolerable even if no end play is included. Deployed state roundness at the ends of the strut can be achieved or maximized by the staggered slots 17, shown in FIG. 10.

FIG. 11 shows a plurality of strut ends in their relative positions in a stack of stowed struts. Both ends of the strut are flat and each end includes two circular holes 18 for attachment to the nodes 13. Located adjacent to the two node mounting holes 18 is a keyway 19. Also in FIGS. 6 and 7 it will be noted that along the strut length there are other periodically space keyways 19. As will be explained in more detail later, these keyways 19 are used to hold the struts in their stowed state.

The keyway in the flat part of the strut ends is used to handle the strut during and after expansion, and it will be noted that the keyways are alternately clocked 90 degrees on adjacent struts in the stowed position as shown in FIG. 11.

Mounted longitudinally to the conical shell at the mid point of the strut is a plurality of spring clips 20. These clips bridge the two transverse slots between the bases of the two conical shells, and when the shells are compressed these clips are disengaged, as shown more clearly in FIG. 12. When the strut is fully expanded the clips 20 engage the strut shell, as shown in FIG. 13, to provide structural continuity between the two conical portions of the strut.

For stowage the struts are stacked side by side in the compressed position to achieve high packaging density. As indicated the keyways 19 are clocked 90 degrees between successive struts in the stack. As will be subsequently explained this is done to implement the retaining, release and engagement of struts in the structural assembly process.

A fixed geometry strut 21 is shown in FIG. 14. It is of a generally hat-shaped cross-section and tapers towards each end from a maximum cross section at strut mid point. Both ends of the strut are flat and include the two node attachment holes 18. This fixed geometry strut 21 does not have the structural efficiency and column/beam stability of the expandable strut 12, and while it must be heavier than the expandable strut for comparable performance, it is simpler to fabricate, stack and deploy. Because no prestresses exist in the stacked condition of the fixed geometry struts 21, the number of keyways 19 for hold down purposes may be less than those needed in the deployable strut 12. As in the deployable strut, excess cross-section is reduced by isogrid hole patterns.

Tapered struts, of the fixed geometry 21 and expandable types 12 are inherently more efficient than constant cross-section struts. This is especially true of structures primarily designed for stiffness. The expandable strut 12 is the preferred embodiment for most structural applications and is the type shown in all figures except FIG. 14.

FIGS. 15 and 17 illustrate enlarged views of two nodes 13 taken from FIG. 5. The node in FIG. 15 has six spring leaf legs attached to a solid hub 22 containing a keyway 19. As seen in FIG. 16, each leg consists of two spaced leaves 23 and 24, two locating pins 25 attached to leaf 23 that engage the strut ends 12, and a lead-in flare 26 that minimizes the necessary alignment between the strut and node at assembly. As indicated in FIG. 16 after the strut end 12 is inserted between the spring leaves 23 and 24 it must be tilted to pass over the pins 25 to be finally assembled.

FIG. 17 shows a plurality of stacked nodes 13. As in the case of the struts, the keyways 19 are clocked 90 degrees between successive nodes in the stack. A shaft mounted dog 27 retains the stacked nodes when the dog is crosswise to the keyway. When the dog 27 is rotated into alignment with the keyway 19 the node at the top of the stack can be removed while the node directly below it is inhibited by the dog 27. This is also the type of release and containment system used for the struts, and its use will be described hereinafter.

Note that the lead-in flares 26 of leaves 23 and 24 are staggered along the node legs. This allows the space between the leaves to be occupied by the alternately located flares 26 so that nodes may be stacked flush for stowage.

Figure 18:
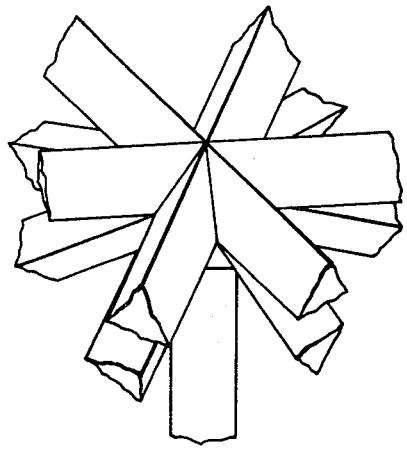
FIGS. 18 through 20 show the junctions of different numbers of truss structures coming together to form a structural joint, and are taken substantially at the areas indicated by circular section-lines 18, 19 and 20 respectively in FIG. 4.
Figure 19:
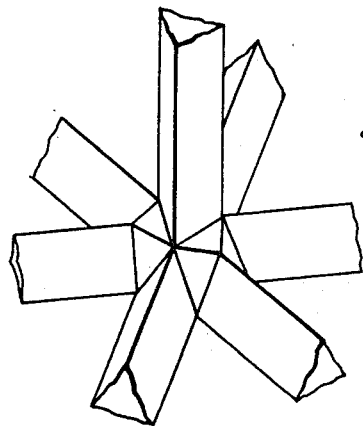
Figure 20:
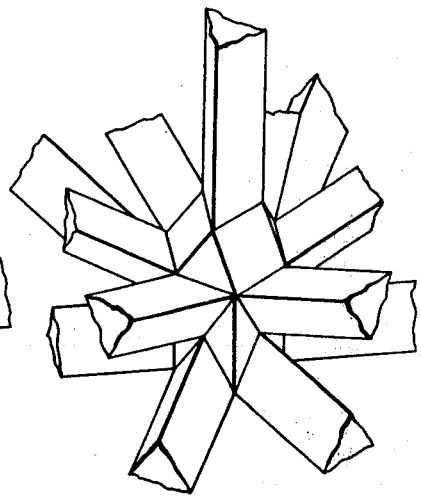
Figure 21:
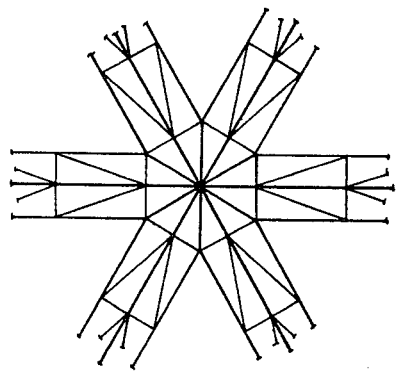
FIG. 21 is a top view of the junction shown in FIG. 18.
Figure 23:
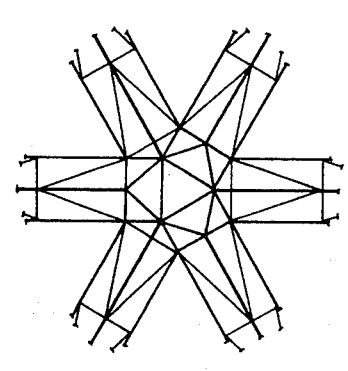
FIG. 23 is a top view of the junction shown in FIG. 19.
Figure 25:
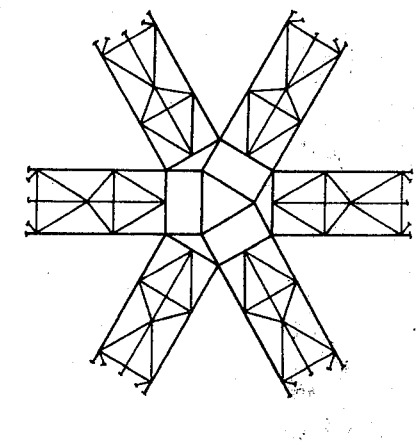
FIG. 25 is a top view of the junction shown in FIG. 20.
Figure 22:
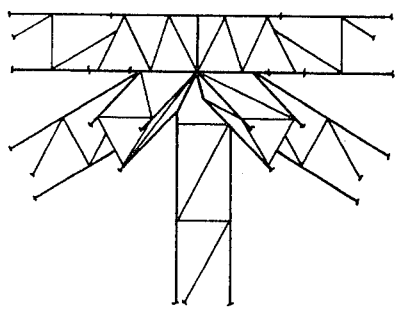
FIG. 22 is a side view of the junction shown in FIG. 21.
Figure 24:
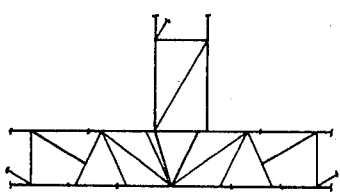
FIG. 24 is a side view of the junction shown in FIG. 23.
Figure 26:
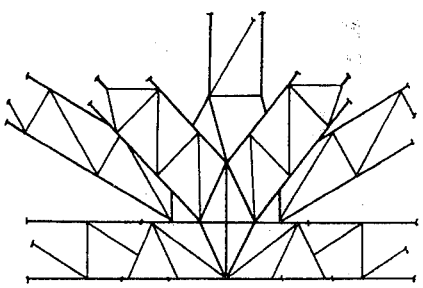
FIG. 26 is a side view of the junction shown in FIG. 25.

FIGS. 18, 19 and 20 illustrate three different truss junction forms that may be utilized in various structures of the type illustrated in FIG. 4. Further, FIGS. 21 and 22 are plan and elevation views respectfully of the truss junction shown in FIG. 18; FIGS. 23 and 24 are similar views of the truss junction shown in FIG. 19; and FIGS. 25 and 26 are plan and elevation views of the truss junction shown in FIG. 20. The arrangements of struts forming the truss junctions provide structural continuity between trusses terminating on the junctions, while at the same time they provide uninhibited communication between the internal cross sections of these trusses. This is essential for free movement throughout the entire structure of a trolley, to be later described, and because of these unique truss junction characteristics it is possible for an assembler trolley to pass through the junction when crawling between the insides of two trusses terminating on the junction. The assembler trolley assembles both the trusses and junctions by moving along the inside of the completed truss structures. When the assembly is completed the trolley is then capable of crawling to any part of the assembled structure.

As was previously described, the nodes 13 in each individual truss structure are of the same arrangement of all points along the truss. However the strut nodes located in the truss junctions may be of a different arrangement than the nodes 13 used in the individual trusses. A typical truss junction node 28 is shown in FIG. 27. For specific truss junctions the node will vary in the number of additional legs and their orientation, however any node arrangement must be of a shape that will allow high density stacking. The most efficient stacking results from stacking similar or comparable nodes in common stacks. In some cases mixed stacking of different nodes is possible without loss of stacking efficiency.

An important feature of all nodes 13 and 28 is the solid hub 22 to which the spring leaf legs 23 and 24 are attached. These hubs are configured to be engaged by tong type grippers from both the inside and outside of the truss or truss junction structure. Because of this important feature, engagement between the assembler trolley and the structure can be primarily limited to the node hubs 22, and the trolley can function on either the inside or outside of the trusses and truss junctions. Since the nodes are also the strongest, most reinforced, parts of the structure they are the best places to apply the necessary trolley actuation loads. A coincident common point of intersection is provided by the geometry for all lines of force acting on the spring leaf legs and the hub of each node.

The assembler trolley 30 is shown in a perspective view in FIG. 28. The trolley performs three primary functions:

It stows the structural component parts in high density pre-packaged, easy-to-handle, canisters;

It assembles the component parts into a structural arrangement, either by means of a pre-programmed scenario or by a remote control/monitor system;

And it is used for access to any part of the structure to make repairs, modifications, or install non-structural items such as, for example, solar blankets, reflector surfaces, scientific instrumentation, attitude control devices, and electronic packages.

The trolley 30 comprises a forward crawler 31 and a rear crawler 32 which are joined together by a coupler shaft 33. The forward crawler 31 mounts twelve manipulator arms 34 and 35, four manipulator arms disposed on each of the three exterior side surfaces of the forward crawler 31. The three manipulator arms 34 at the forward end and the three manipulators 34 at the rear end of the forward crawler 31 have single stage axial extension capability, while the six manipulator arms 35 located in the mid area of the crawler, two per side, have two stage extension capability.

The twelve manipulator arms, 34 and 35, have rotary drives disposed at the base end where attachment is provided to the forward crawler 31. Linear drives are also provided to retract and extend the manipulators, permitting up to a three to one change in reach. All manipulator arm drive functions are preprogrammed and numerically controlled. The total number of manipulator arms disposed on the forward crawler 31 is a function of the desired assembly rate of the trolley 30. As few manipulator arms as two per side, a total of six on the forward crawler, 31, may accomplish the assembly task. However the maximum assembly rate is attained when approximately seven manipulator arms are disposed on each side of the crawler, a total of twenty-one manipulator arms located on the forward crawler 31. This optimum number of manipulator arms applies to the triangular truss described herein, and other structural forms may require more or less manipulator arms. The functions performed by the manipulator arms and two embodiments of these arms will be described in greater detail later herein. It should be understood that if desired to accomplish certain assembly functions, manipulator arms may also be located on the rear crawler 32.

In FIG. 29 is shown a more detailed view of the coupler shaft 33, which connects forward crawler 31 with rear crawler 32. The coupler shaft 33 is connected to the rear crawler 32 by means of a universal joint 36, having an azimuth pivot pin 37 and an elevation pivot pin 38. Rotation around the azimuth pivot 37 is controlled by azimuth drive motor 39 which drives a gear head which mates with gear teeth contained on azimuth pivot pin 37, the gear drives not shown. In a like manner rotation about the elevation pivot 38 is controlled by elevation drive motor 40.

Located near the forward crawler 31 is a second universal joint 42, having a similar arrangement to the first universal joint 36. Rotation around the azimuth pivot 43 is controlled by azimuth drive motor 45, and rotation around the elevation pivot 44 is controlled by elevation drive motor 46. The distance between universal joint 36 and universal joint 42 is variable by means of shaft 48 telescoping within larger diameter shaft 49. Displacement of inner shaft 48 is controlled by a linear drive 50, which comprises a linear drive motor 51 that drives a pinion which in turn is engaged with a gear rack mounted on the shaft 48, in a conventional rack and pinion arrangement. For clarity of FIG. 30 none of the gear drive arrangements are shown, since all are of a conventional arrangement well known by those skilled in the art. The linear drive 50 also provides a keying function so that no axial rotation of inner shaft 48 is possible relative to outer shaft 49.

Figure 30:
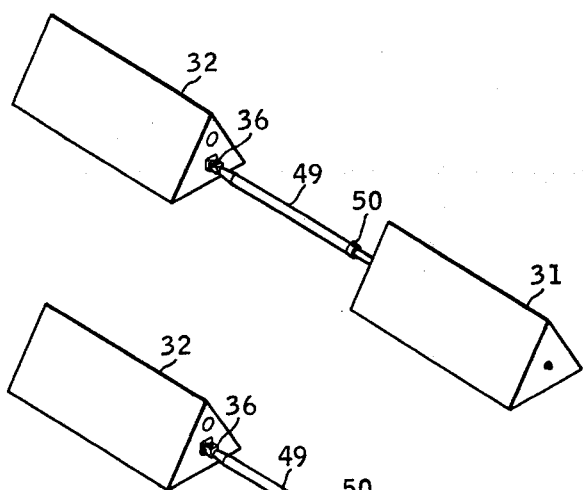
FIGS. 30 through 34 are perspective views showing the maneuvering of the forward crawler relative to the rear crawler.

Attached to the forward universal joint 42 is a rotary drive 52, comprising a drive motor 53 that drives a gear that is fixedly attached to the end of a forward shaft 54 such that drive motor 53 may rotate shaft 54 around its longitudinal axis. The forward shaft 54 is shown in FIG. 30 fully telescoped within the forward crawler 31. The shaft 54 may be extended from the crawler 31 by means of a linear drive 55 that is attached to the forward crawler 31. The linear drive 55 functions in the same manner as linear drive 50.

From the foregoing it may be seen that the distance between the forward crawler 31 and rear crawler 32 is variable by means of linear drive 50 extending or retracting inner shaft 48 within outer shaft 49. Further, it may be seen that the forward crawler 31 may be displaced in azimuth relative to rear crawler 32 by actuation of azimuth drive motor 39 and/or azimuth drive motor 45, and in a like manner displacement in elevation may be accomplished by elevation drive motor 40 and/or elevation drive motor 46. Longitudinal rotation of forward crawler 31 relative to rear crawler 32 is accomplished by actuation of rotary drive 52. And finally, it will be observed that the distance of the forward universal joint 42 from the forward crawler 31 is variable by means of linear drive 55 extending and retracting the forward shaft 54 within the forward crawler 31.

Figure 31:
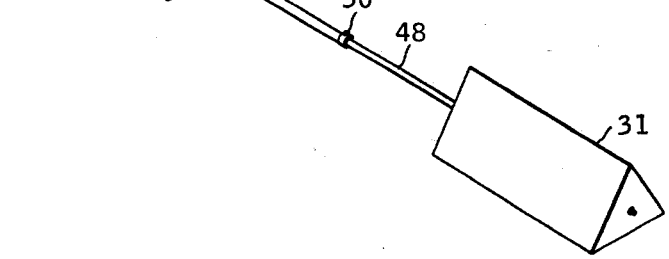
Figure 32:
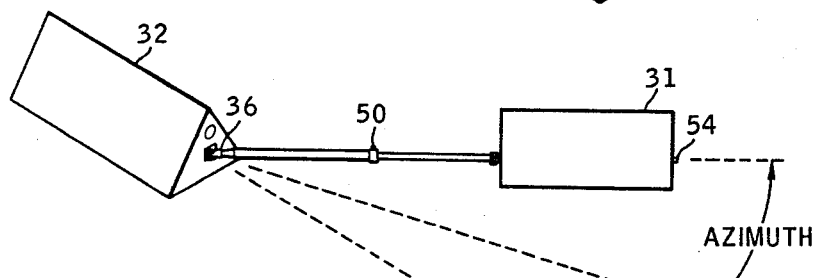
Figure 33:
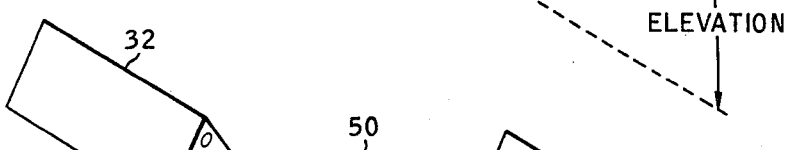
Figure 34:
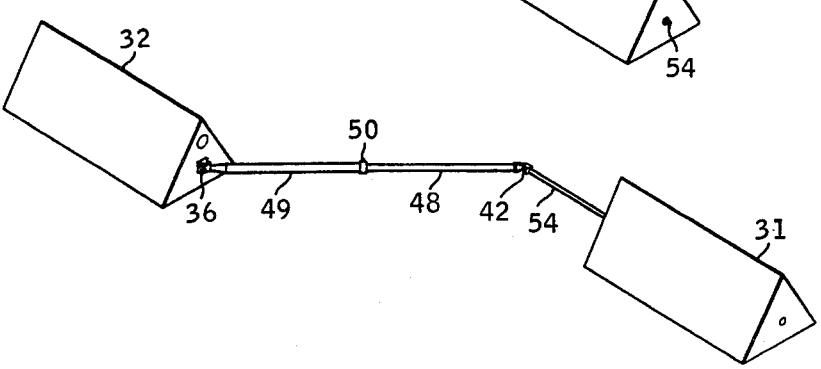

Thus, if inner shaft 48 is extended the two crawlers move apart as shown in FIG. 30 and 31. If azimuth drive motor 39 and elevation drive motor 40 of rear universal joint 36 are actuated the forward crawler 31 will be displaced in azimuth and elevation from rear crawler 32, as shown in FIG. 32. The longitudinal axis of the forward crawler 31 will be parallel with the longitudinal axes of outer shaft 49, inner shaft 48, and forward shaft 54, and will be skewed relative to the longitudinal axis of rear crawler 32. If the azimuth drive motor 45 of the forward universal joint 42 is driven an equal amount in the opposite direction to azimuth motor 39, and elevation motor 46 is driven an equal amount in the opposite direction to elevation motor 40, the forward crawler 31 will remain disposed in azimuth and elevation relative to rear crawler 32, but the longitudinal axes of the two crawlers will be parallel as shown in FIG. 33. The forward crawler 31 may now be moved forward from the forward universal joint 42 by actuating the forward linear drive 55 which extends forward shaft 54, as shown in FIG. 34. The forward crawler 31 may also be rolled about the forward shaft 54 by actuating the rotary drive 52. In this regard, it may be understood that the movements of the crawlers about their three major axes may be described as ROLL (controlled by rotary drive 52) PITCH (controlled by elevation motors 40 and 46) and YAW (controlled by aximuth motors 39 and 45).

The FIGS. 30 through 34 illustrate only one example of the displacement maneuvering of forward crawler 31 relative to rear crawler 32, but from this example it should be clear what the displacement capabilities are, and it should be understood that all necessary drives may be operated simultaneously if desired to effect a smooth transition to the new position of crawler 31, rather than the stepped displacements described in the example.

Figure 35:
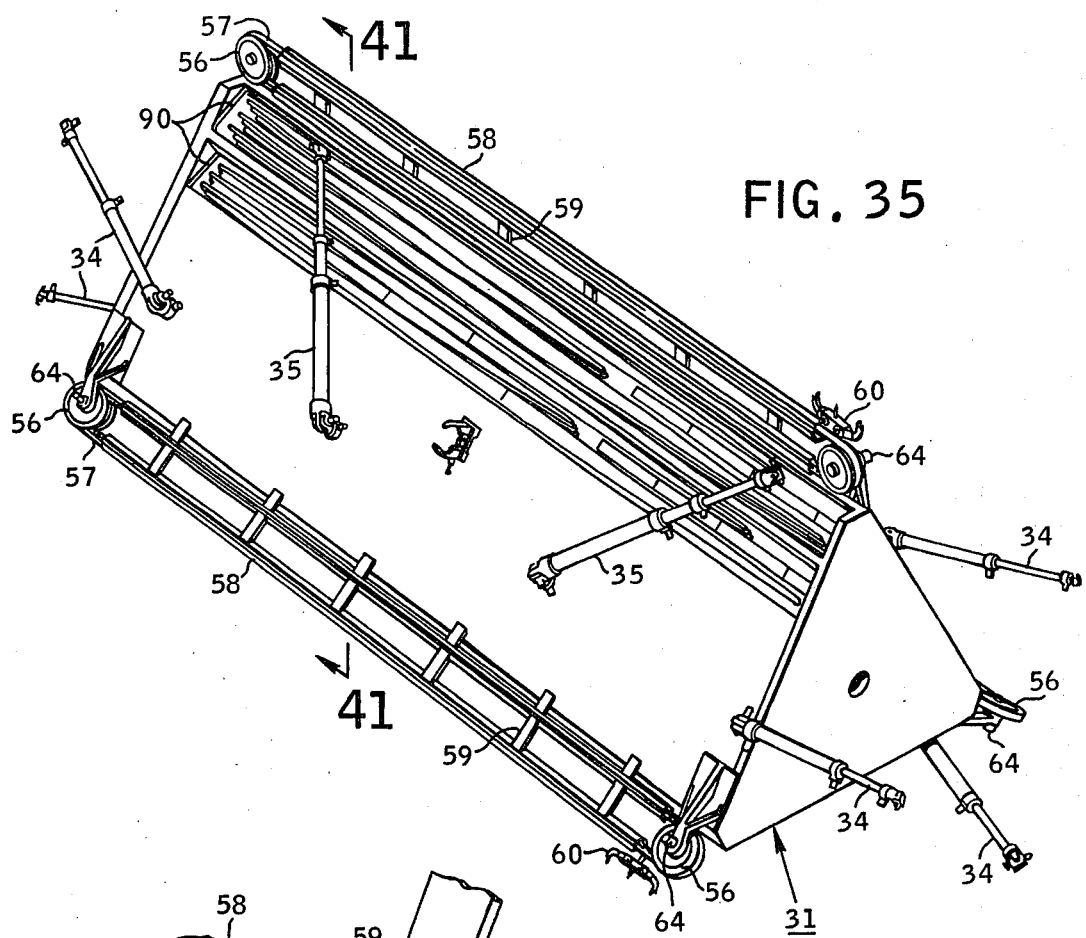
FIG. 35 is a perspective view of the forward crawler.

FIG. 35 is a more detailed view of the forward crawler 31, wherein it may be seen that a pair of pulleys 56 are mounted at opposite ends of each edge formed by two intersecting side surfaces of the crawler. A total of six pulleys 56 are so located on the crawler. A run-around, or continuous, belt 57 is wrapped around each pair of pulleys 56, and rests in a belt guide 58. The belt guide 58 is attached to the crawler by a plurality of belt guide supports 59. Attached to each belt 57 are node grippers 60, one of which is shown in more detail by the enlarged view in FIG. 36.

Figure 36:
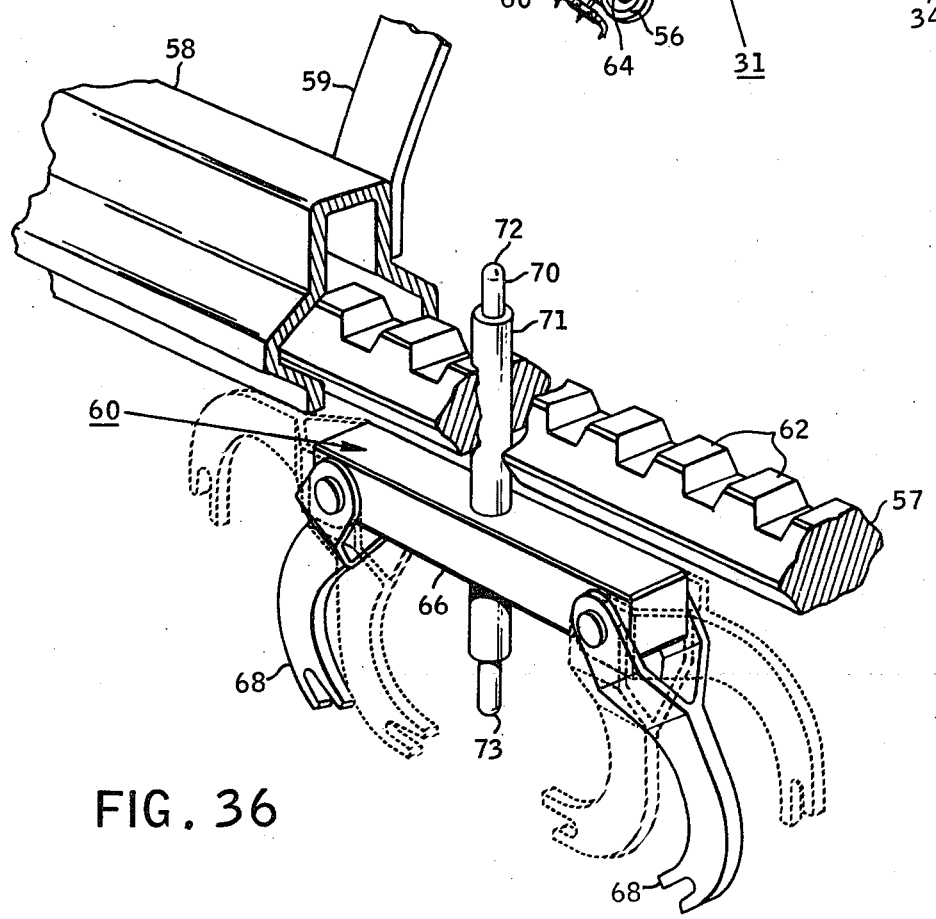
FIGS. 36 through 39 are enlarged partial views of the transport belt and grippers of the forward crawler showing operations of the node grippers.

FIG. 36 illustrates the node gripper 60 that is located on the lower belt 57 near the forward pulley 56 of FIG. 35. It will be seen that belt 57 is of a generally hexagon cross section and is guided on the four side surfaces by belt guide 58. The inner surface of the belt 57 comprises a plurality of serrations or what may generally be described as rack gear teeth 62. These teeth 62 engage mating teeth on the pulleys 56, each of which is driven by a motor 64, best seen in FIG. 35. These motors, 64 like all the drive motors utilized on the assembler trolley 30 are direct current stepping motors that are servo controlled by pre-programmed controllers.

Figure 38:
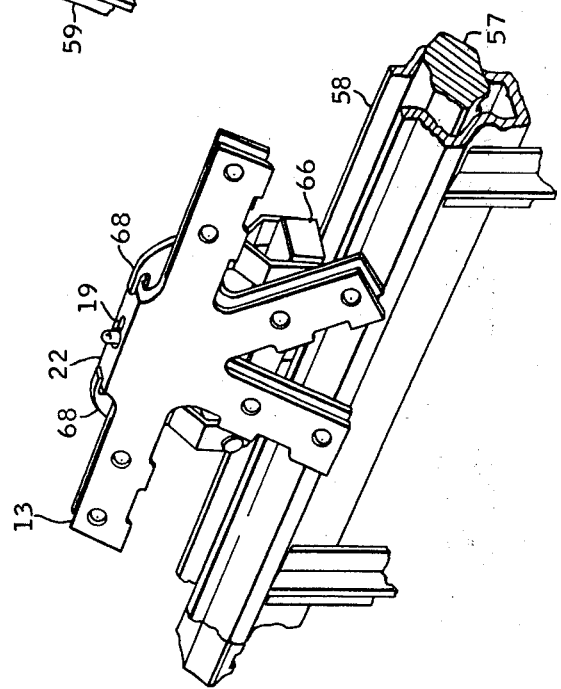

The node gripper 60 comprises a spreader bar 66 and a pair of gripper jaws 68, one pivotally mounted to each end of spreader bar 66. The gripper jaws are rotated by means of the up and down stroke of jaw actuator rod 70 within the jaw actuator guide 71, down motion causing the jaws to open and upward motion causing the jaws to close. At the top end of the jaw actuator rod 70 is a spherical surface 72 which functions as a cam follower, and at the bottom end of the rod 70 is a second spherical-surfaced cam follower 73. The actuator guide 71 is fixedly mounted within the belt 57 and carries the node gripper 60 along the belt as the belt is driven from one pulley 56 to the other pulley 56. At points along the inside top surface of the belt guide 58 are linear ramps which serve as cams to force the jaw actuator rod 70 down to open the jaws 68. As the node gripper 60 approaches a structural strut node 13, see FIGS. 5 and 15, the lower cam surface 73 of jaw actuator rod 70 is forced upward by contact with hub 22 of strut node 13, thereby causing the gripper jaws 68 to close and grip the strut node 13. This may best be seen in FIGS. 37, 38 and 39.

Figure 39:
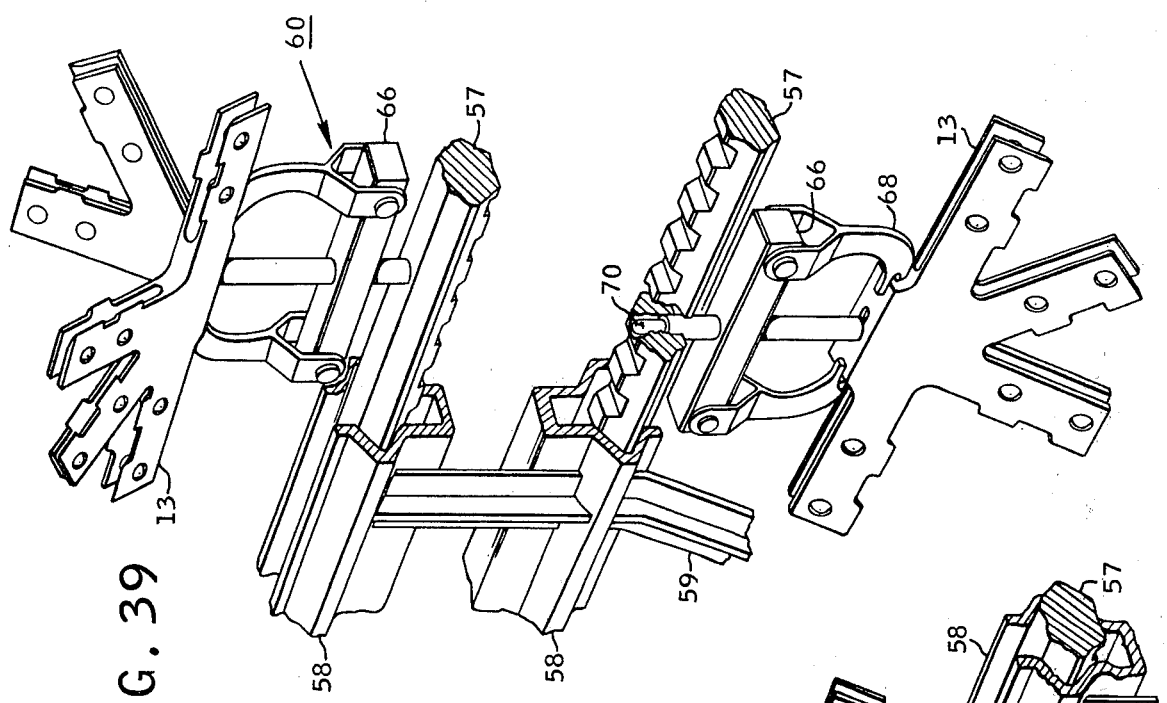
Figure 37:
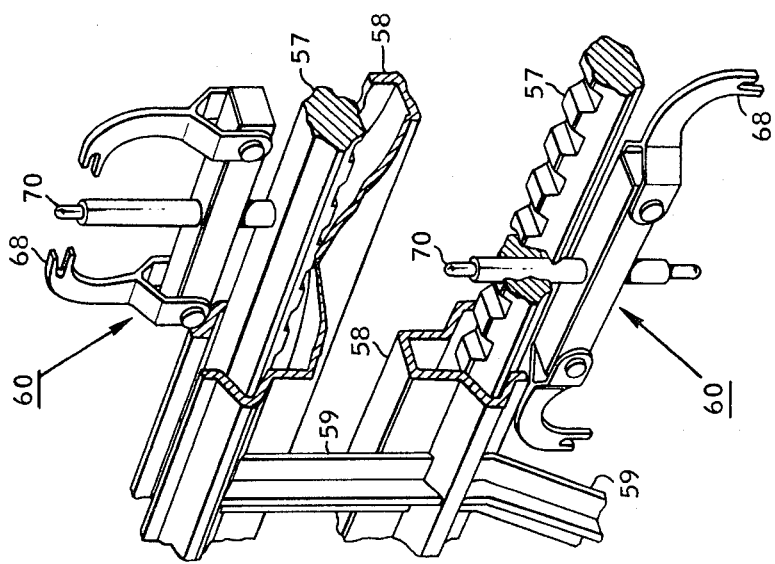

In FIG. 37 is shown a node gripper 60 attached to the lower portion of belt 57. This node gripper 60 is in the opened position and is located on the belt in the same manner as the gripper shown in FIG. 36. On the upper portion of belt 57 is another node gripper 60 in the closed position, since the actuator rod 70 was forced up by the ramp in belt guide 58. This normally is the position for gripping a strut mode, such as is shown in more detail in FIG. 38. Here it is seen that the jaws 68 have closed and locked on the hub 22 of a strut node 13. It should be noted that in this particular instance the crawler is within the truss structure 10 and is gripping the inside surface of node 13. As was previously stated, the trolley may travel inside of a truss structure 10 or on the outside of a truss, and in FIG. 39 is shown a strut node 13 being engaged on the outside surface by a gripper on the upper portion of belt 57. The same arrangement for a gripper 60 located on the lower portion of belt 57 is also shown, and it should be clear that the trolley may travel externally either above or below a truss structure.

Figure 40:
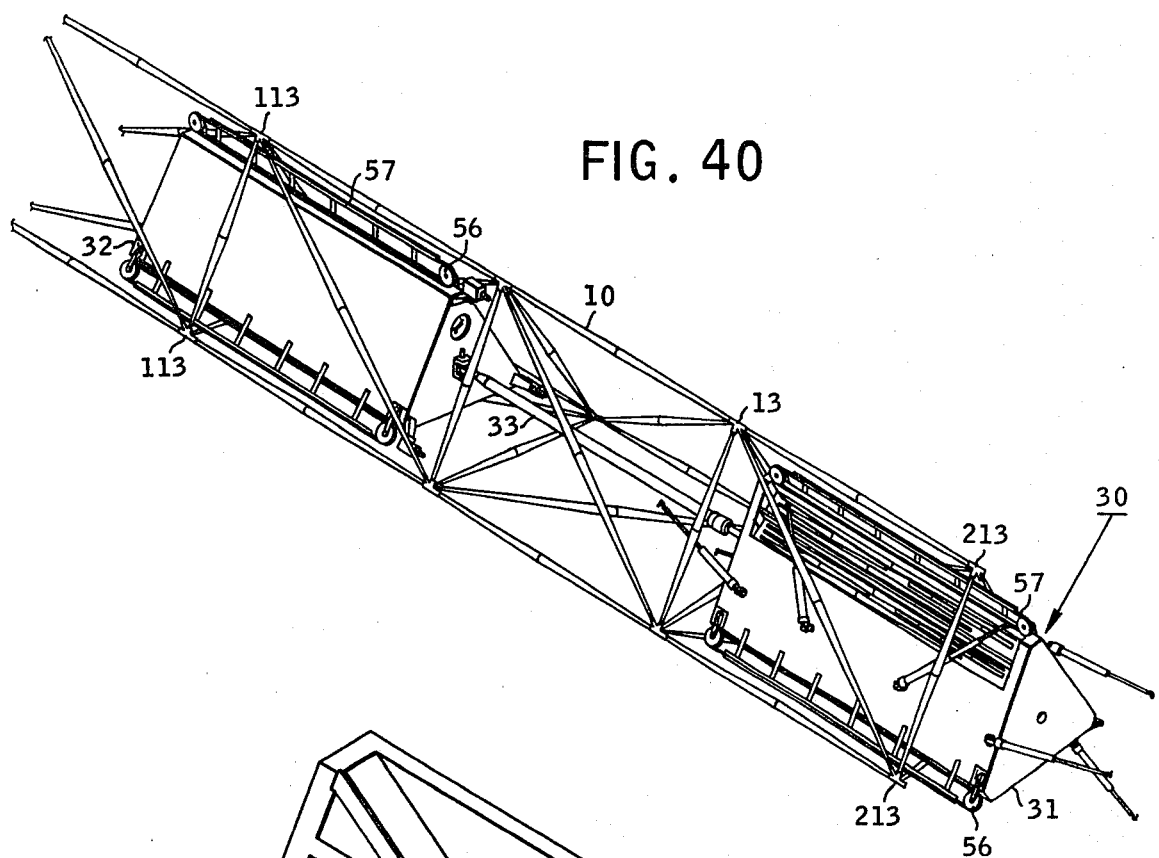
FIG. 40 is a perspective view of the assembler trolley within a truss structure.

In FIG. 40 the trolley 30 is located within the truss structure 10. It will be noted that the rear crawler 32 has three belts 57 and six pulleys 56 of the same general arrangement as the forward crawler 31. The three node grippers 60 of the rear crawler 32 are gripping the three strut nodes 13 located at the truss station designated as 113, and the three node grippers 60 of the forward crawler 31 are gripping the three strut nodes 13 located at the truss station designated as 213. The trolley may continue through the truss structure 10 by driving in unison all the belt drive pulleys 56, and as it passes the next set of strut nodes 13 a second set of node grippers 60 on the belts 57 will grip the nodes while the grippers now locked will open. Another method to move the forward crawler 31 in the truss structure is to release the node grippers at truss station 213, while the rear crawler 32 maintains a grip on nodes at truss station 113, and then extend or retract the crawler coupler shaft 33.

Figure 41:
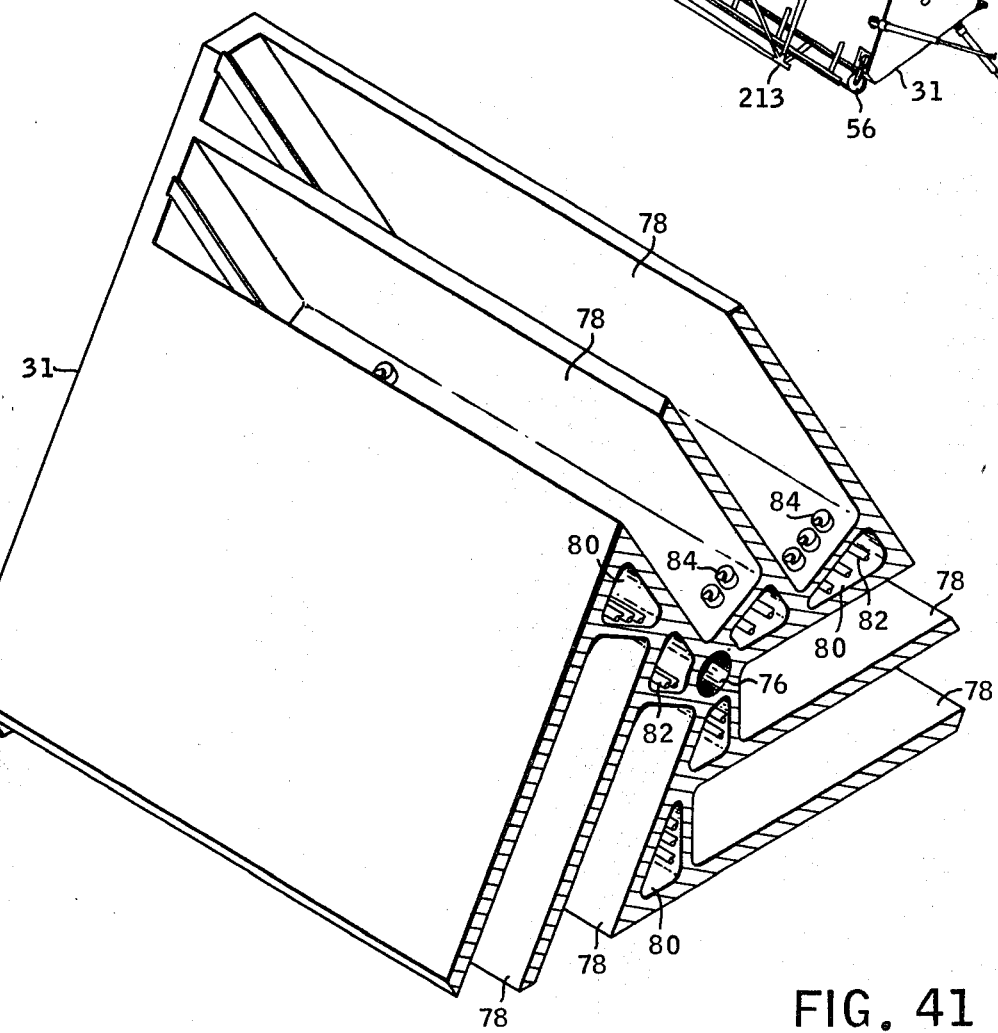
FIG. 41 is an enlarged cross-section of the forward crawler primary structure taken substantially from a plane indicated by line 41—41 in FIG. 35.

FIG. 41 shows a perspective view and cross-section of the primary structure of forward crawler 31. At the approximate geometric center of the crawler is the longitudinal guide 76, within which the forward control shaft 54 (FIG. 29) moves fore and aft. The forward crawler structure is shaped to form six long rectangular cargo compartments 78 and six triangular cross-section control shaft raceways 80. Disposed within each of the control raceways 80 are a plurality of coupling drive shafts 82 which reach approximately the full length of the raceways 80 and are journalled for rotation therein. Spaced along the bottom surface of each argo compartment 78 are a plurality of drive couplings 84 which are engaged by means of miter gears to the coupling drive shafts 82 so that rotation of the shafts 82 will rotate the associated couplings 84.

Figure 43:
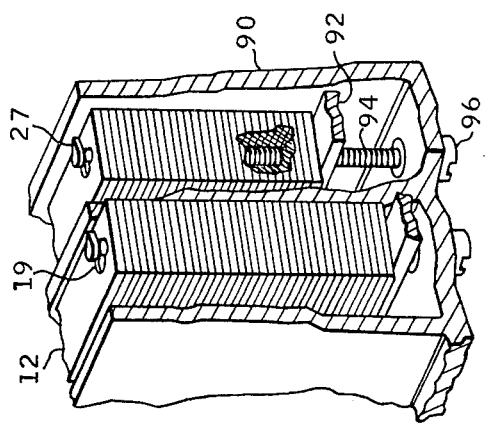
FIGS. 42 and 43 are views of the struts and nodes storage canister.
Figure 42:
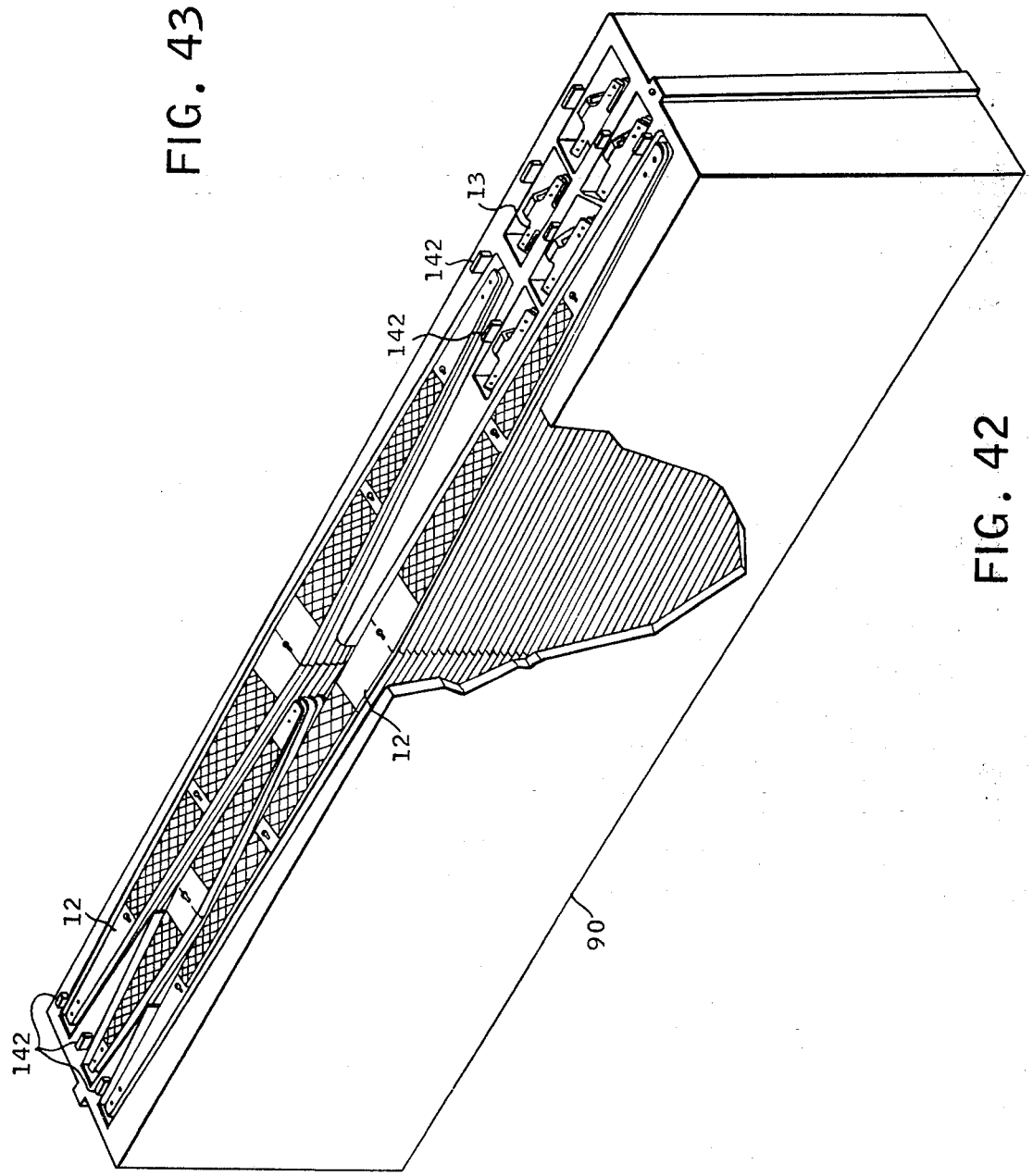

FIGS. 42 and 43 are perspective views of a cargo canister 90 which is sized to fit within the canister cargo compartment 78 of the forward crawler 31. Stowed within the canister 90 are snugly stacked struts 12 and strut nodes 13. At the bottom of each stack of struts 12 and nodes 13 is located a stack advance plate 92. A plurality of lead screws 94 pass through the keyways 19 of struts 12 and nodes 13, through a stack advance plate 92, and through the bottom wall of the canister 90, terminating at the bottom end with a drive coupling 96 which is shaped for engagement with a mating coupling 84 in the cargo compartment 78 of the forward crawler 31. At the top end of each lead screw 94 is mounted a dog 27 which is shaped to pass through keyway 19 when properly oriented, but to retain the struts 12 and nodes 13 at all other rotated positions. The stack advance plate 92 is threaded for engagement with the lead screw 94 so that rotation of the lead screw causes the plate 92 to advance. It should be noted that no lead screw or dog is disposed within the keyway located at either end of the struts.

The thread pitch of lead screw 94 is a function of the thickness of an individual strut 12 or node 13. If the keyways 19 are alternately clocked as shown in FIG. 11, then the dogs 27 must alternately rotate 450 degrees once to align with a keyway 19 and rotate 270 degrees the next time to align with the next clocked keyway, thereby requiring a repeated cycling of 270 degrees rotation followed by 450 degrees and then 270 degrees rotation, etc. The average rotation of the lead screw is 360 degrees per thickness of strut, but the maximum and minimum rotations must be accounted for in the thread pitch and the compressability of the stack of struts or nodes. Such an arrangement requires only two configurations of struts or nodes, that is keyways at 0 degrees position and 90 degrees position. Another arrangement requires four configurations of struts and nodes, wherein keyways are clocked at 0 degrees, 90 degrees, 180 degrees and 270 degrees. With this arrangement the lead screw 94 is rotated 450 degrees each cycle to align the dog 27 with the next keyway 19, thus eliminating the variable rotation required by the two position keyway arrangement. Either arrangement may be utilized with satisfactory results. The function of the lead screw 94 and dog 27 is to allow only one strut 12 or node 13 at a time to be removed from the canister.

Thus it may be seen that the forward crawler 31 is capable of carrying a large quantity of struts and strut nodes in the six canisters 90 stowed in the six cargo compartments 78.

If one man can assemble a given structure in one-hundred hours, the task may be described as a one-hundred manhour task. However, this does not necessarily imply that the task could be accomplished with the arithmetic equivalent of one-hundred men working for one hour. Analysis may reveal however that there does exist an optimum number of men to assign to the task to complete it in the minimum number of manhours. For example, three men may accomplish the task in thirty hours, thereby expending a total of only ninety manhours. In a like manner a time-motion kinematic analysis was conducted, directed at the assembly procedure utilizing various numbers of manipulator arms 34 and 35 disposed on the forward crawler 31. It was concluded that a minimum of two manipulator arms per side, six per crawler, could assemble the basic triangular truss structure 10. It was also concluded that maximum utilization of the crawler is obtained when seven manipulator arms are disposed on each of the three sides of the crawler. The configuration of the manipulator arms differ for these two conditions, the two arms per side arrangement being less complicated than the seven arms per side arrangement. Thus, if time is not critical it may be worth sacrificing time in order to utilize a simpler manipulator arm arrangement. Later herein the assembly method utilizing two manipulator arms and the method utilizing seven manipulator arms will both be described. Before this may be done however it is first necessary to describe each of the two manipulator arm embodiments.

Figure 44:
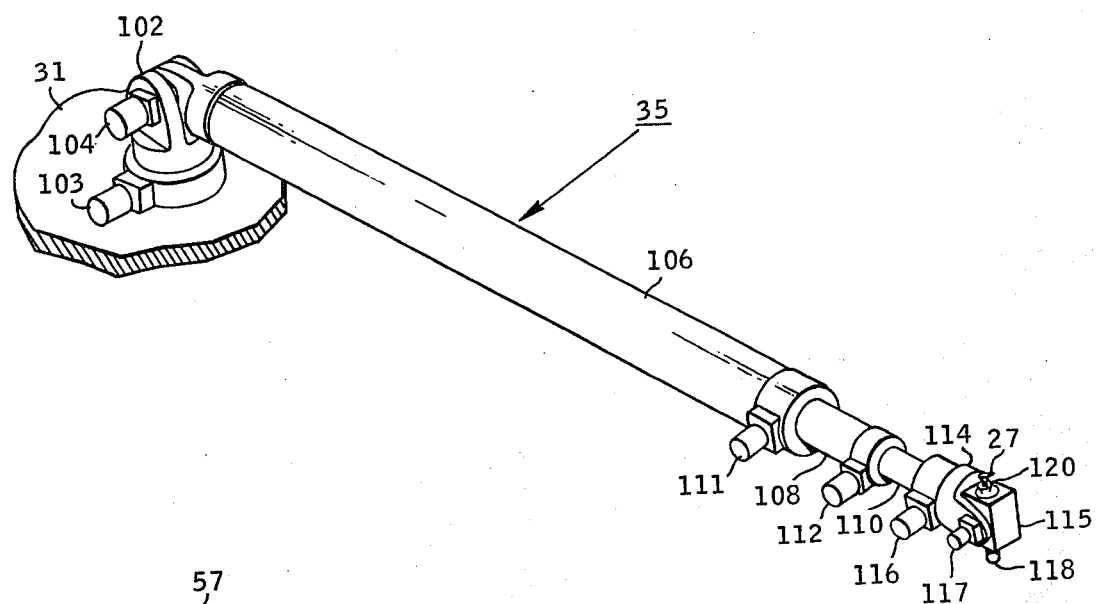
FIG. 44 is a perspective view of a tubular telescoping manipulator arm.

FIG. 44 is an enlarged view of a double extending manipulator arm 35. The shoulder joint 102 attaches to the forward crawler 31 and comprises two drives, a shoulder roll drive motor 103 which rotates a bevel pinion that is meshed with a bevel ring gear attached to the crawler side, and an elevation drive motor 104 which rotates the manipulator arm about the motor 104 shaft centerline. Extension and retraction of the arm length is accomplished by three telescoping tubes 106, 108 and 110. The middle tube 108 is moved in and out of outer tube 106 by means of the linear drive 111, while inner tube 110 is moved in and out of middle tube 108 by means of linear drive 112. These two linear drives 111 and 112 operate in the same manner as the linear drive 50 on the crawler coupler shaft 33 shown in FIG. 29. Functionally the outer tube 106 may be described as a sleeve, the middle tube 108 as a first arm telescoping within sleeve 106, and the inner tube 110 as a second arm telescoping within the first arm 108.

The wrist joint of the manipulator arm comprises a clevis fitting 114, which supports a trunnion mounted wrist block 115. The clevis fitting is rotated around the longitudinal centerline of tube 110 by means of the rotary drive 116 which operates in the same manner as the shoulder roll drive 103. The wrist block 115 is rotated around its trunnion by means of drive motor 117. The wrist block 115 is bored along its major axis, perpendicular to the trunnion centerline, to accept the shaft of drive motor 118. Fixedly attached to the end of the shaft of drive motor 118 is a backup disc 120 and dog 27. The backup disc is spaced from the dog a distance approximately equal to the thickness of a strut 12 or node 13. The dog-disc may be arranged other than shown, wherein the dog 27 and keyways 19 are of other matching geometric shapes, such as triangular or rectangular for example. The dog is bevelled on the leading edge to reduce the engagement tolerance with a matching keyway in a strut or node. The manipulator arm removes struts and nodes from the canisters 90, carries them to the truss structure and releases them when installed in their proper positions. The dog-disc 120 is typically rotated in 90 degree increments to first engage and then disengage the keyways 19 in the struts and nodes. As in the case of the crawler coupler shaft assembly 33 the manipulator arm motors are direct current stepping motors which are pre-programmed and numerically controlled.

Figure 45:
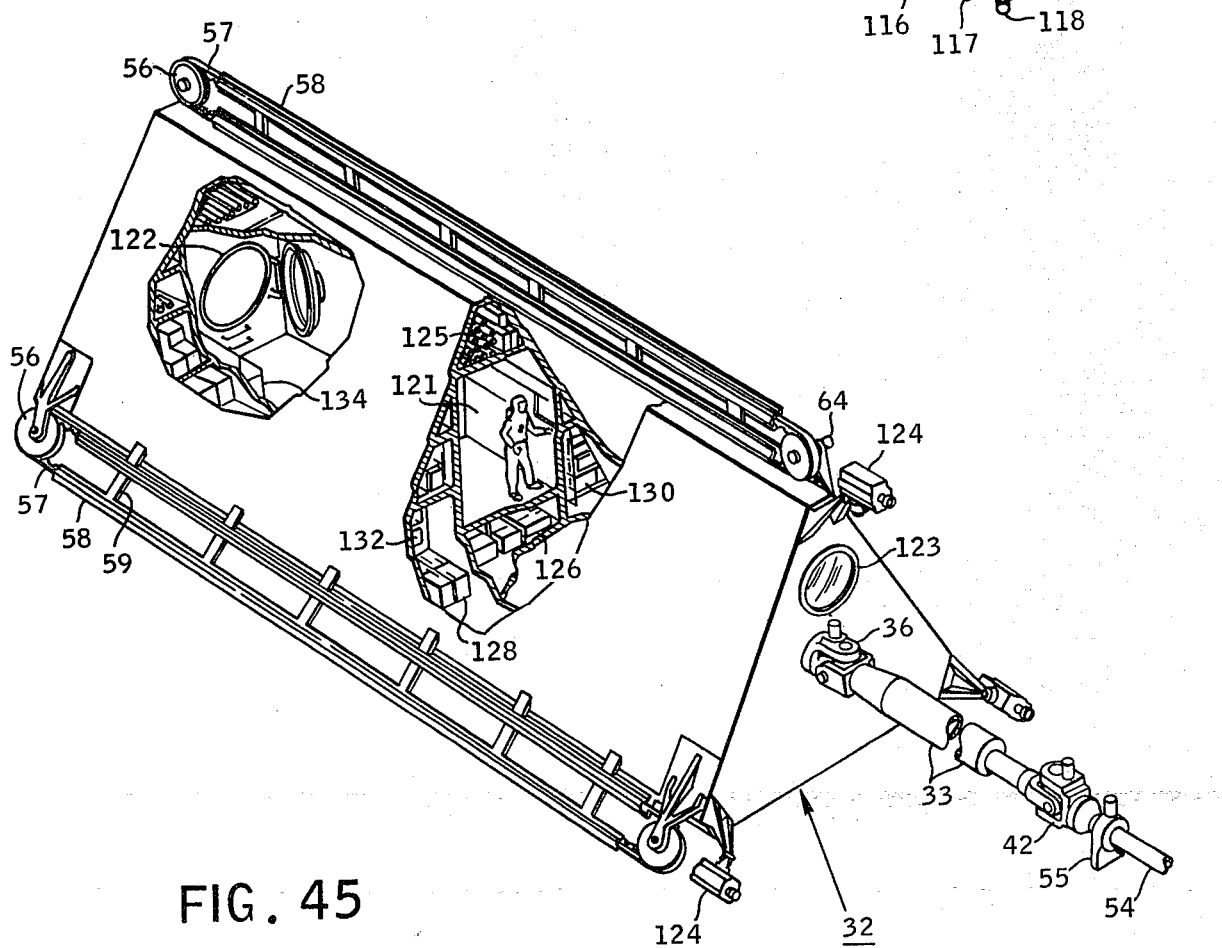
FIG. 45 is a perspective view of the rear crawler.

FIG. 45 is a cutaway view of the rear crawler 32, wherein the major compartment 121 is crew quarters. Located in the rear bulkhead is an air lock 122 which is for crew transfer in and out of the crawler. A transparent port hole 123 is located in the forward bulkhead, and a plurality of remote operated television cameras 124 are disposed around the forward bulkhead for visual observation of the forward crawler 31 and the structure assembly procedure.

The long triangular shaped compartment 125 directly above the crew compartment is provisioned with spare parts such as pulleys 56, belts 57, manipulator arms 34 and 35, coupler shaft 33, and spare structural struts 12 and nodes 13. The compartment 126 located below the crew compartment floor houses the navigation, communication, and telemetry electronic equipment. Batteries and fuel cells 128 are located to the right of the crew compartment 121, and on the left side is located the power conditioning systems 130. The numerical control systems 132 are located above the batteries, and the environmental control systems 134, utilized to condition the crew compartment and all electronic systems is located near the rear bulkhead. Thus, it may be seen that the rear crawler 32 functions as the command center for the assembler trolley, while the forward crawler 31 performs the cargo carrying and structural assembling functions. Both crawlers 31 and 32 and the interconnecting coupler shaft 33 work cooperatively to perform the trolley transport functions, primarily by means of the traveling belts 57 and node grippers 60.

FIGS. 46 through 56 show the primary sequential events in the assembly of one bay of the truss structure 10. For clarity in these figures the rear crawler 32 and the interconnecting crawler coupler shaft 33 are not shown, but it should be understood that the rear crawler 32 is firmly attached to the inside of the truss structure 10 by means of its six grippers holding on to three nodes at one truss station and three more nodes at a second truss station and is supporting and guiding the forward crawler 31 by means of the coupler shaft 33. Further, it should be understood that each of the manipulations by the two arms 35 on the near side of the forward crawler 31 are being simultaneously done by manipulator arms 35 on the other two hidden sides of the forward crawler.

In FIGS. 46 and 47 the forward manipulator arm 35 removes a structural node 13 from the canister 90 and carries it to the node gripper 60 located at the forward end of the transport belt 57. The node grippers are spaced on the transport belt at precisely the structural node-to-node distance of truss structure 10. At this particular time the forward gripper is located on the lower portion of the transport belt, not having as yet passed over the forward pulley 56. The gripper will carry the node along as it continues traveling with the transport belt.

It will be seen that the last bay of the truss structure has not been completed, lacking the three truss station or cross-member struts. The rear node grippers of the crawler are gripped to the end nodes, but since the cross-member struts are not in place the nodes, which are connected to the ends of the longitudinal struts only, are not capable of providing support to the forward crawler. The forward crawler is supported by the crawler coupler shaft 33, cantilevered from the rear crawler 32.

FIGS. 48, 49 and 50 illustrate the installation of the cross-member strut. As was previously described, the stacks of struts and nodes are restrained in the storage canister by lead screw mounted dogs. The lead screws pass through keyways in the struts and nodes, the keyways being clocked 90 degrees between the successively stacked struts and nodes. To release a strut the dogs are rotated to align with the long dimension of the keyways. The top strut can then be removed, but the next strut in the stack is prevented from being released, because the keyway in it is clocked to interfere with the dog. Before a strut is released from the canister it is first gripped by the manipulator arms by means of the dog-disc tool 120 engaging the end keyway of the strut, the end strut keyway not having a lead screw passing therethrough. When each manipulator arm has engaged the keyway on its end of the strut the canister dogs are rotated and the strut is released.

Before a node is released the dog on the operative manipulator arm is brought into alignment with the dog retaining the node stack from which the node is to be released. The manipulator arm dog is clocked to allow the subsequently released node to pass directly onto it. When this has happened the manipulator arm dog is clocked 90 degrees to engage the node. The manipulator arm then delivers the node to its assembly position. Separate keyways may also be provided in each node for use by the manipulator arm exclusively, such as those provided on each end of the struts if it is so desired.

In FIG. 49 the strut is being inspected. As was previously described, the struts are stored flat, and spring action of the strut causes it to become round after release from the canister. One of the inspections is to determine that the strut has properly expanded to the full round condition. In FIG. 57 the device for making this inspection is shown. A track fitting 136 and fixed jaw 137 are attached to the side of the forward crawler. Slideably mounted within the track 136 is a moveable jaw 138, which may be moved back and forth in the track by means of a lead screw that is rotated by stepping motor 140. A displacement sensor 141 is disposed on the track fitting 136 to determine the strut diameter. After the strut is placed on the fixed jaw 137 by the manipulator arms, the movable jaw 138 slides into position. The moveable jaw 138 is driven by a torque limited drive. Sensors are included to determine when this limit is exceeded to indicate incomplete strut expansion. If the strut has not properly deployed and action of the jaws on it does not cause deployment, several remedial actions may be taken: several axial force reversals can be applied by the manipulator arms carrying the strut; with the jaws 137 and 138 engaged, small bending moments can be induced at the strut center by the manipulator arms; and the strut can be axially rotated and displaced with the jaw 138 backed off to lightly hold the center of the strut. Should a strut not pass inspection after these actions an abort sub-routine is commenced for disposal of the strut. If space permits, it may be placed in the storage compartment 125 in the rear crawler 32 for analysis of the failure mode or for later repair.

In FIG. 50 the cross-member strut is being inserted into the spring legs of the truss nodes. After this strut is aligned with the appropriate node legs it is manipulated to pry open the legs, wedge over the locating pins 25 in the node and achieve installation as previously described and shown in FIG. 16. Small fore-and-aft and side-to-side shaking forces are applied to jog the strut to assure completion of a possibly incomplete installation. This closes-out or completes the truss bay structure. It will be seen that as the manipulator arms carried out the functions shown in FIGS. 46 through 50 the crawler has moved forward, and the nodes installed on the transport belt 57 have moved around the forward pulley 56 and now are on the top portion of the belt.

All of the truss assembly operations are performed while the crawler is moving forward at a constant velocity. Constant velocity is an essential feature of the system for several important reasons. The assembly time would be greatly increased if start-stop movement of the crawler was used. Of even more importance are the weight and power considerations. The power requirements for braking and accelerating the trolley would be significantly higher than the constant velocity requirements. The inertia forces imposed on the nodes by the node grippers to react pitch, roll, and yaw inertia moments of the crawlers when braking or accelerating would be of sufficient magnitude to require beef-up of the truss structure, resulting in an unsatisfactory weight increase. Both crawlers and the interconnecting coupler shaft would likewise increase in weight. Normal stopping and starting distance for the trolley is one to one and a half structure bay lengths.

In FIGS. 51, 52 and 53 the longitudinal strut is installed. The removing of the strut from the canister and the inspection of the strut is the same as previously described. The rear end of the strut is then inserted into the end node 13 of the last completed truss bay while the forward end of the strut is inserted in the node 13 being carried by the node gripper on the transport belt. Immediately after this operation is completed the aft node gripper passes by a cam mounted on the belt guide which releases the gripper as previously described, and the node gripper passes over the rear pulley.

In FIGS. 54, 55 and 56 the diagonal strut is installed. The crawler has released its grip on the last nodes of the closed-out bay and has progressed into the incompleted bay. The node on the forward end of the longitudinal strut is still retained by the belt mounted gripper as the crawler continues moving forward. The diagonal strut is removed from the canister, inspected, and inserted into a node at each end as was previously described. The crawler continues to move forward by means of the rear crawler moving forward within the completed truss structure by gripping and releasing structural nodes, the transport belts on both crawlers working in precise unison, until the forward crawler reaches the position shown in FIG. 46. The assembly sequence shown in FIGS. 46 through 56 is then repeated.

Referring again to FIG. 42, which shows the cargo canister, it will be observed that manipulator arm indexing shoulders 142 are located on the top edge of the canister 90 at each stack of nodes and at each end of the stacks of struts. These index shoulders 142 serve the function of guiding the manipulator arm dog-disc tool to the final keyway engagement position. Without the index shoulders 142 it would be necessary for the manipulator arms to have significantly greater positioning accuracy. It should be understood that other indexing means may be used such as for example notches in the top surface of the canister. The end of the manipulator arm searches out the indexing shoulder or notch 142 and rests upon it. In this position the manipulator dog-disc tool 120 may be moved normal to the plane of the stowed strut as well as in a direction parallel to this plane and perpendicular to the strut axis. Positional hunting maneuvers in these two directions will readily locate the manipulator dog-disc tool in its final desired position.

In the preceding assembly method the various steps were conducted one at a time in a series procedure. In order to increase the speed of assembly it is necessary to resort to a parallel procedure in which various steps are conducted simultaneously. This is necessary because the speed at which each step is performed is limited to a maximum that keeps all starting and stopping inertia loads of the manipulator arms as well as the crawler below the design allowables of the structure. In order to accomplish a parallel procedure it is necessary to utilize a more sophisticated manipulator arm having more maneuverability to handle struts in a manner that prevents collisions. Secondly, it is necessary to locate all drives, including those for actuating the dog-disc, close to the base end of the arm where they will produce minimum inertia loads. This will not only reduce the weight of the arm structure and crawler support structure, but will significantly reduce the power required for actuating the arm. It should be understood that such an arm may also be utilized in the two arm arrangement previously described.

FIG. 58 is an overall perspective view of a manipulator arm 200. The arm comprises two triangular shaped telescoping truss structures, an arm 202 which is slideably mounted within a sleeve 204. An extension-retraction motor 206 drives a continuous run-around belt 208 which moves within the sleeve 204 and is connected by clamp 209 to the base end of the arm 202 to effect telescoping movement of the arm 202 within the sleeve 204. The sleeve 204 is rotatably mounted to a shoulder joint 210 and is rotated about its longitudinal axis by the roll drive motor 212. The sleeve 204 is elevated up and down by an elevation drive motor 214 rotating pinion 216 that meshes with a sector gear 218. The shoulder joint 210 is rotated about an axis perpendicular to the side surface of the forward crawler by means of a train drive motor 220 rotating a pinion 222 that meshes with a train gear 224.

Located at the working end of arm 202 is the dog-disc 226 which is rotated by means of a belt drive connected to dog-disc roll motor 228. The dog-disc 226 is also rotatable about an axis perpendicular to one side of the arm 202 by means of a belt drive connected to dog-disc pitch motor 230. For clarity the belt drives for dog-disc roll and dog-disc pitch are not entirely shown in the figure, but will hereinafter be shown and described.

In FIG. 59 is shown a schematic presentation of the dog-disc pitch belt drive arrangement. The pitck drive motor 230 is rotating drive pulley 232 in a counterclockwise direction. The drive pulley 232 is arranged to have gear teeth that mesh with mating teeth on the inner surface of the first stage pitch belt 234 which is wrapped around a portion of idler pulley 236 to form a continuous belt arrangement. Meshed with the teeth of first stage pitch belt 234 is a transfer pulley 238. The motor 230 and the two pulleys 232 and 236 are all mounted on sleeve 204. Integral with transfer pulley 238 is a second transfer pulley 240 that is located in arm 202 and meshes with and drives the second stage pitch belt 242 that wraps around pitch drive pulley 244 mounted in arm 202. The result of this arrangement is that a counter-clockwise output of drive pulley 232 in sleeve 204 is transferred by means of transfer pulley 238 and 240 to the arm 202 and results in a counter-clockwise rotation of the dog-disc pitch shaft 246.

In FIG. 60 is shown a schematic presentation of the dog-disc pitch drive arrangement that is the same as FIG. 59 except that arm 202 has extended from sleeve 204. If the first stage belt 234 remains stationary as the arm 202 is extended from sleeve 204, the transfer pulley 238 must rotate clockwise as it "walks" along first stage belt 234 from its position in FIG. 59 to that shown in FIG. 60. The result of this "walk" of pulley 238 would be to produce a clockwise rotation of the dog-disc pitch shaft 246. To prevent the extension of arm 202 to effect the pitch attitude of the dog-disc it is therefore necessary that pitch drive motor 230 rotate in a counter-clockwise direction to drive first stage belt 234 at precisely the same rate as the "walking" rate of transfer pulley 238. This is accomplished by a negator signal being sent to motor 230 that is of the same sign and of proportional value as the signal sent to extension-retraction motor 206, (FIG. 58).

The dog-dics roll belt drive system is arranged in the same way as the dog-disc pitch belt drive system, just described, so that a negator signal is also sent to the dog-disc roll motor 228 whenever the extension-retraction motor 206 receives a command signal.

FIG. 61 is a view of the bottom surface of the arm 202 at the working end showing the dog-disc tool 226. The dog-disc is journaled in a wrist fitting 248 and terminates with a bevel gear 250 that meshes with a second bevel gear 252. The wrist fitting 248 is in turn journaled in bearing 254 which is mounted in the arm 202.

FIG. 62 is a side view of the arm 202 and includes a cross-section through the dog-disc joint, where the wrist fitting 248 is more clearly seen. Fixedly attached to the wrist fitting 248 is the second stage pitch drive pulley 244 that is engaged by second stage pitch belt 242 for rotating the wrist fitting 248 in its support bearing 254. Disposed within the wrist fitting 248 are two bearings 256 that support a gear shaft 258 which is fixedly attached to a second stage roll drive pulley 260 that is engaged by second stage roll drive belt 262. Thus it can be seen that the wrist joint comprises a coaxial drive arrangement wherein rotation of the drive pulley 260 causes the dog-disc 226 to be displaced in roll angle by means of the two bevel gears 250 and 252, and the dog-disc to be displaced in pitch angle when the pitch pulley 244 is rotated. If the roll pulley 260 is held stationary and the pitch pulley 244 rotates the wrist fitting 248 the large bevel gear 250 will rotate as it "walks" around the small bevel gear 252, causing a pitch induced roll of the dog-disc 226. This induced roll must be negated by a counter rotation of the roll pulley 260. This is accomplished by a biasing signal being sent to the dog-disc roll motor 228 (FIG. 58) whenever a command signal is sent to the dog-disc pitch motor 230.

At the base end of arm 202 are located the dog-disc transfer pulleys. The second stage pitch belt 242 passes around transfer pulley 240, while the first stage pitch belt 234 is engaged on one side by pitch transfer pulley 238 as previously shown in FIG. 59. In a like manner the second stage roll belt 262 passes around transfer pulley 264 and pulley 268 engages one side of first stage roll belt 270. The two roll transfer pulleys 264 and 268 have their axis clocked 60 degrees with respect to second stage dog-disc roll drive pulley 260 at the working end of arm 102, thus requiring a 60 degree twist in belt 262.

FIG. 63 more clearly shows the arrangement of the dog-disc roll transfer pulleys 264 and 268. Located in arm 202 is a bearing 272 which supports transfer pulley 264 so that it is disposed within the arm 202 and supports the pulley 268 so that it is disposed externally to arm 202 and within the sleeve 204, so that it is accessible to the first stage roll drive belt 270 that is powered by the dog-disc roll drive motor 228. A belt hold-off guide 274 is located on the external surface of the arm 202 and disposed between the belt 270 and pulley 268 to assure that the belt does not contact the pulley on that side. Diametrically opposite is located a belt engagement guide 275 which bears against the back of belt 270 to assure positive engagement of the belt with the pulleys 268. These two guides 274 and 275 are more clearly shown in FIG. 64.

In FIG. 65 it may be seen that the pitch transfer pulleys 238 and 240 are supported from arm 202 by two bearings 276 such that transfer pulley 240 is disposed within arm 202 and accessible to second stage pitch drive belt 242 which wraps around pulley 244 at the working end of arm 202, and transfer pulley 238 is disposed in sleeve 204 to be accessible to the first stage pitch drive belt 234 that is powered by the pitch drive motor 230 mounted to the base end of sleeve 204.

From the foregoing it should be understood that a runaround belt drive is located on each of the three inside surfaces of the manipulator sleeve 204. Each of the belts pass around a power driven pulley located near the shoulder end of the sleeve 204, one per side, each powered by its respective motor (extension-retraction 206, dog-disc roller 228, and dog-disc pitch 230), and over one of the three idler pulleys, one mounted on each of the side surfaces of sleeve 204 at the far end. Further, the two dog-disc control belts each engage moveable transfer pulleys that transfer belt motion to the dog-disc 226 located on the working end of arm 202 at any extension position of the arm 202 relative to sleeve 204. The dog-disc 226 has more than 360 degrees capability in pitch and roll, and the manipulator sleeve 204 has more than 360 degrees capability in train and roll.

FIG. 66 is a side view of the working end of manipulator arm 200 taken while looking along the external surface of forward crawler 31. The dog-disc tool 226 is perpendicular to the crawler surface 31 in the "normal" position, designated by the letter N. The dog-disc must be rotated clockwise approximately 30 degrees to be perpendicular to the surface of the top strut 12 in the strut stack retained in canister 90, see FIGS. 41 and 42. This is the position of the dog-disc for picking up a strut or node from the canister and is designated by the letter P. From the "pickup" position, P, the dog-disc is rotated counterclockwise approximately 210 degrees to the "flipped" position, designated by letter F. In the flipped position the dog-disc is holding the strut away from the crawler surface so that other manipulator arms 200 may pass below the strut, between the strut and crawler surface, without collision with the strut.

As was previously described, a strut 12 is removed from the canister 90 by two manipulator arms 200, one engaged to each end of the strut 12. If the two manipulator arms 200 are perpendicular to the strut, i.e. the two manipulator arms 200 are parallel to one another, the strut may be flipped simply by rotating the dog-disc 226 in pitch the required amount as shown in FIG. 66. However, if the manipulator arms are not parallel to one another and perpendicular to the strut at the time a strut is to be flipped, the coordinated movement of the two manipulator arms employs the use of all drive motors in order to keep the two dog-disc axes parallel to each other as they rotate in pitch to the flipped position.

Figure 67:
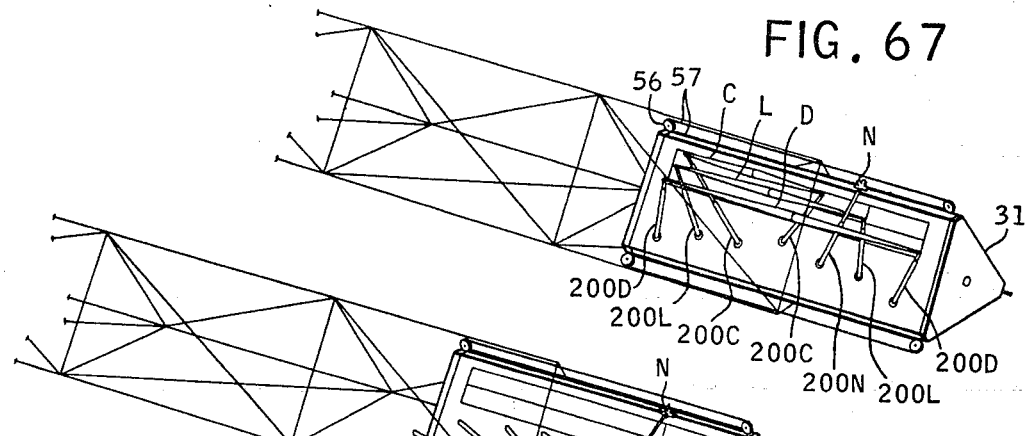
FIGS. 67 through 72 indicate the parallel sequential steps of the forward crawler assemblying a truss structural bay.

In FIG. 67 seven manipulator arms 200 are located on one of the external surfaces of the forward crawler 31. Each manipulator arm has a specific assignment. One manipulator arm 200N transport nodes from the canister to the node gripper, two manipulator arms 200D handle the diagonal struts, two arms 200L handle longitudinal struts, and two arms 200C handle cross-member struts. Struts are removed from the canister in the following sequence:

All arms are positioned below the two arms 200D. With the dog-disc in the pickup position (FIG. 66) the two arms 200D remove the diagonal strut from the canister and flip the diagonal strut.

The two arms 200L move below arms 200D and remove and flip the longitudinal strut.

The two arms 200C move under arms 200D and 200L, and after the longitudinal strut has passed over the arms 200C the arms 200C remove and flip the cross strut.

Figure 68:
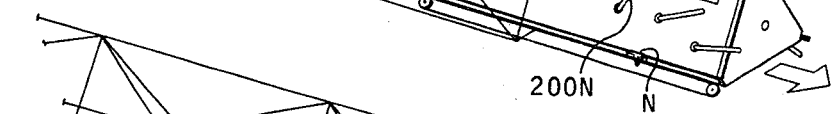

FIGS. 68 through 72 show the assembly sequence. In FIG. 68, manipulator arm 200N removes a node from the canister and moves it to the node gripper 60 which is traveling along transport belt 57. Arm 200N brings the node up to the same speed and direction of the node gripper and holds it in position for the gripper to acquire the node, whereupon the arm 200N releases the node.

Figure 69:
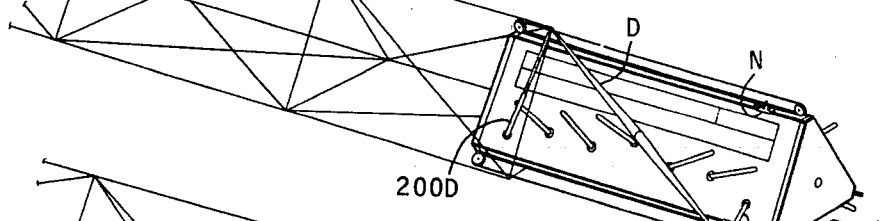

In FIG. 69, the two arms 200D position the diagonal strut and insert the top end into the truss mounted node. The rear arm 200D then releases the diagonal strut, while the lower and forward arm 200D continues to hold on to the diagonal strut.

Figure 70:
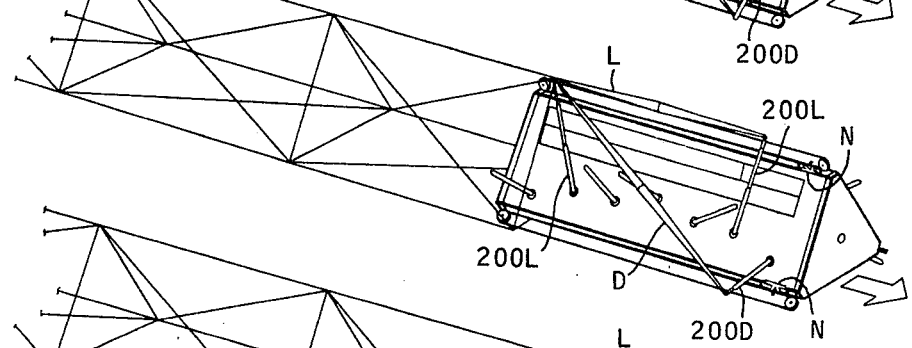

In FIG. 70, the two arms 200L position the longitudinal strut and insert the rear end into the top truss mounted node. The rear arm 200L then releases the longitudinal strut, while the forward arm 200L continues to hold on to the forward end of the longitudinal strut.

Figure 71:
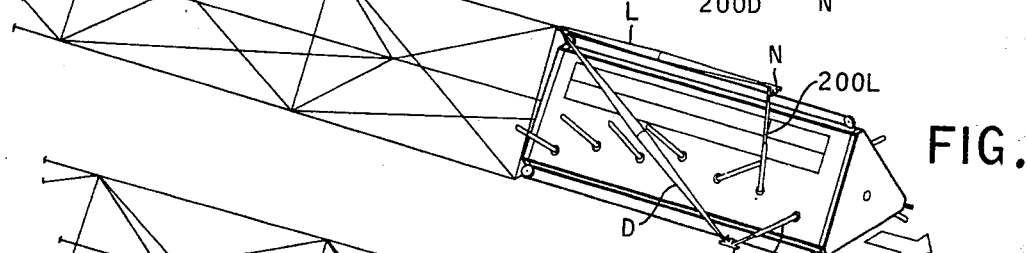

In FIG. 71, the arm 200L continues to hold on to the forward end of the longitudinal strut until the node being moved along transport belt 57 arrives in position, whereupon arm 200L inserts the end of the longitudinal strut in the node and then releases the longitudinal strut. In the same manner arm 200D inserts the forward end of the diagonal strut in its transport belt retained node and then releases the diagonal strut.

Figure 72:
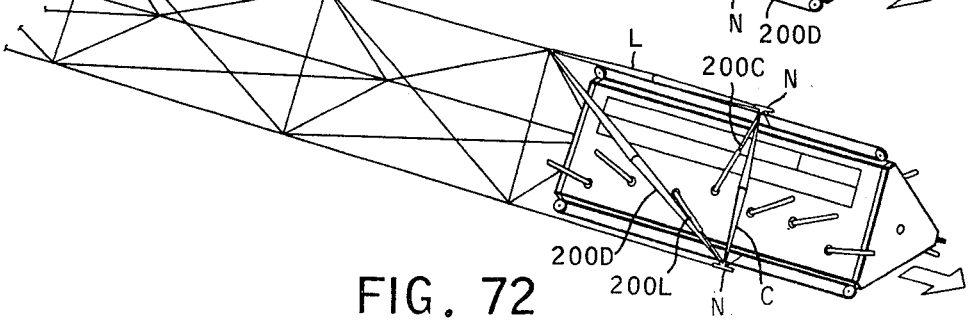

In FIG. 72, arms 200C position the cross strut and insert it in the upper and lower nodes, whereupon the belt mounted grippers 60 release the nodes, and the sequences shown in FIGS. 68 through 72 are repeated.

It should be understood that the sequences shown in FIGS. 67 through 72 may overlap so that more than one sequence is underway simultaneously. For example, the strut removals shown in FIG. 67 include the flipping of struts which would normally be accomplished while the manipulator arms have started to execute their delivery motions. With this parallel method of assembly the work periods of each manipulator arm are sufficiently long that arm extension and slew rates are sufficiently low to minimize inertia loads, while the transport speed of the crawler, and therefore the speed of assembly, may be significantly faster than the series method, using only two manipulator arms, that was previously described and shown in FIGS. 46 through 56.

It should be understood that truss shapes other than triangular may be assembled using either the series or parallel method of construction, and that the number of sides of the forward and rear crawler may be varied accordingly. For example the crawler cross-section may be a square, rectangle, pentagon, hexagon, or octagon, and the truss structure may be of a similar shape. Additionally, it should be clear that the crawler may have fewer working sides than the sides of the completed truss structure. For example, the triangular truss may be assembled by a triangular crawler having manipulator arms disposed on only one side, and after completing a first side of the truss the crawler would roll 60 degrees and start assembly of the second truss side.

Because the seven manipulator arms arrangement locates each arm near to its maneuvering area, only a single stage telescoping arm is necessary, however if fewer manipulators are employed and the reach must be increased a second telescoping arm may be located within the first arm, and all drive functions transferred from the first arm to the second arm in the same manner as the arm and sleeve arrangement previously described.

In the case where an assembly step is not properly concluded, as indicated by instrumentation or visual observations, it would be necessary to stop the assembly operations. First, the manipulator arms release any struts or nodes that are attached to the completed truss structure. Braking force is applied to the assembler trolley to arrest the forward motion. The stopping distance should be less than approximately one and a half structural bays so that the rear crawler does not disengage from the truss structure. The trolley direction is reversed until the correct crawler position relative to the unfinished structural bay is obtained. Each released strut or node is reacquired by the forward crawler, and subroutine corrective programs are enlisted to conduct corrective maneuvers. If these corrective steps do not reinstate the assembly procedure an abort procedure is initiated, or manual overrides are initiated. In certain cases it may be desirable to bring the forward crawler to a quicker halt than would be accomplished by the preceding braking method. Such a requirement would cause the attendant trolley deceleration forces to rise above what the structure strength would normally allow. Faster than normal braking of the forward crawler is possible to the extent that the crawler coupler shaft 33 is extended at the time of braking. The coupler shaft may be foreshortened at a controlled rate that would first impose only the forward crawler deceleration forces to the structure. After the forward crawler has stopped the rear crawler is decelerated. The peak braking force applied to the structure would be the same as during a normal trolley stop, and the nominal stopping distance of the total trolley would also be the same in order for the energy formula to balance, however the forward crawler could be stopped in a shorter distance, since a portion of the total trolley stopping distance is utilized in closing the distance between the forward and rear crawlers.

Figure 73:
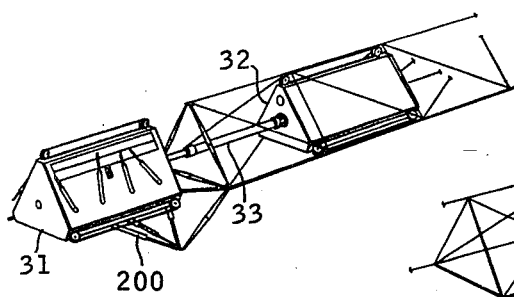
FIGS. 73 and 74 are views of the trolley wherein the forward crawler is assemblying a truss junction.
Figure 74:
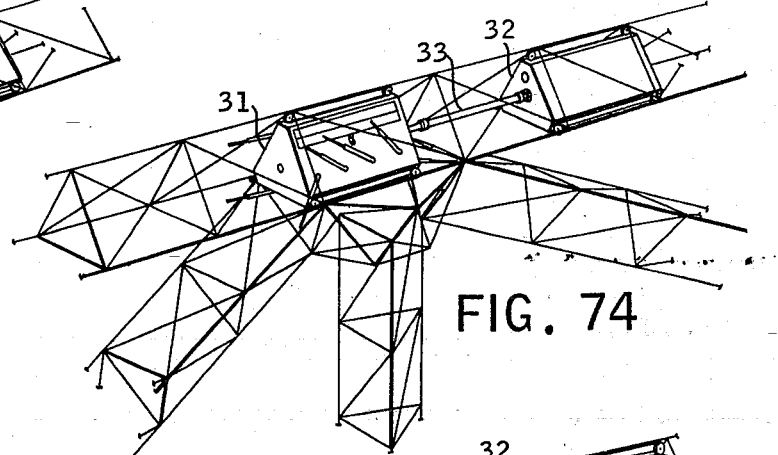
Figure 75:
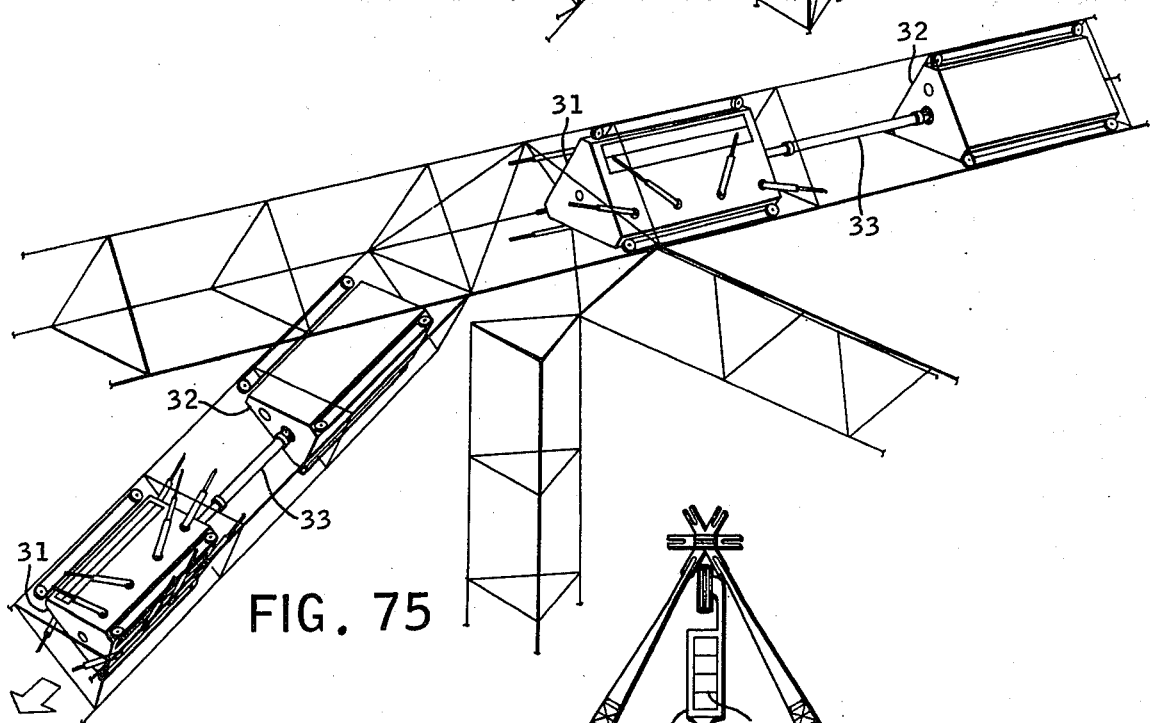
FIG. 75 is a view showing the assembler trolley passing through a truss junction.

At the end of a completed truss a truss junction may be assembled, as shown in FIGS. 73 and 74. The trolley is brought to a stop with the forward crawler 31 positioned beyond the completed truss structure. In this position the movements of manipulator arms 200 and articulations of the coupler shaft 33 are coordinated to assemble an entire truss section, wherein one manipulator arm acts as a fixturing device by holding a node while other manipulator arms install struts in the fixtured node. In some truss junction embodiments the node grippers 60 on the crawler transport belts 57 serve as the node fixturing device. In this manner the forward crawler maneuvers to assemble the truss junction, in some cases the forward crawler attitude may be as much as 90 degrees from the position of the rear crawler which is gripping the previously completed truss. When the truss junction is completed the forward crawler commences to assemble the new truss, and the trolley proceeds into the new truss as shown in FIG. 75. In this particular truss junction it is necessary that the forward crawler roll 60 degrees about its longitudinal axis while passing through the assembled truss junction, followed thereafter by the rear crawler which also rolls 60 degrees as it passes through the truss junction.

Another example of fixturing is when a truss structure is begun. The manipulator arm 200N places a node in the node gripper as shown in FIG. 68. The transport belt 57 carries the node forward around the forward pulley 56 to the top portion of the belt and then toward the rear until the node arrives at the position of the node shown in FIG. 72. At this time there would be three nodes, one in each of the three grippers, each gripper located on one of the three transport belts 57, that would be located in the station plane of the truss. These three nodes are fixtured by the forward crawler until the three cross-member struts are inserted in the nodes as shown in FIG. 72. A structurally stable portion of the truss is now completed, and the assembly procedure can now begin in the sequence shown in FIGS. 67 through 72.

Use of two manipulator arms with coordinating motions while grasping a strut requires a sophisticated control system. Force sensors allow optimum coordination by slaving one of the arms so that it is partially driven by the other arm through the strut. The force levels of the arms are limited so as to not damage the strut.

Each step of the assembly process requires control of closure speeds, loads, and accurate positioning. The control system is aided by override clutches mounted on the manipulator arms as well as sensors for determining force, proximity and touch.

Figure 76:
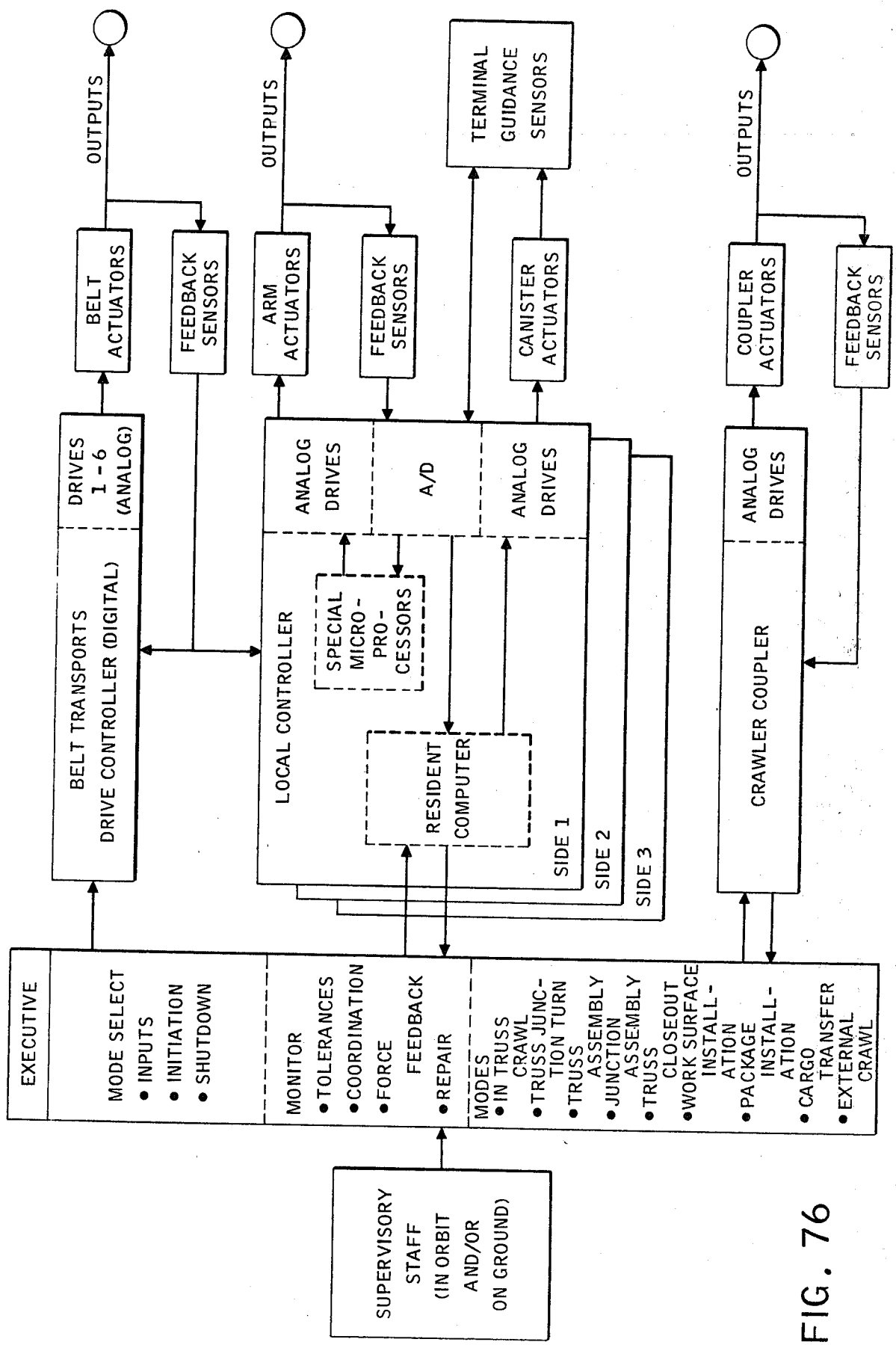
FIG. 76 is a schematic presentation of the control and monitor systems for the assembler trolley.

The overall control system is shown in FIG. 76. The control is basically automatic and can be supervised by man, with computer backup, on the ground and/or in orbit. A central control computer exercises executive control functions. Each side of the forward crawler contains its own local controller with its digital computer, A/D, D/A, analog drives, compensation networks, and microprocessors. Splitting the forward crawler control functions into groups allows fast response between items needing close synchronization. Additionally, the manipulator arms have a microprocessor in their direct control loops to provide reflexive action for each arm.

Thus, it should be understood that the herein disclosed invention comprises an assembled truss structure arrangement and an assembler trolley that carries, handles, and assembles structural elements and other components to the very structure on which it is crawling. The trolley and the structural arrangement are compatible for a wide range of autonomous, self-regulating functions in situ that are monitored, supervised, and as necessary modified by remote sensing and control.

A typical truss has a triangular cross-section and is constructed with tapered struts terminating on nodes. The three sides of each truss bay have similarly oriented diagonal struts. This results in six strut terminations per node and allows all truss nodes to have the same configuration. Other trusses as well as tetrahedral structures having internal clearances for an assembler trolley may also be constructed.

The arrangements of struts forming the truss junction provide structural continuity and fixity between trusses terminating on the junctions. At the same time, they provide uninhibited communication for assembler trolley turning space between the insides of trusses terminating on them.

The assembler trolley assembles the trusses and truss junction by moving along the inside of these structures by means of belt transports incorporating grippers that engage the structure at the nodes. The node has six springleaf legs attached to a solid hub containing a keyway. Each leg consists of two spaced leaves, two locating tapered pins that engage the strut ends, and a lead-in flare that facilitates alignment of the strut and node during assembly.

An important feature of the nodes is the solid hubs to which the springleaf legs are attached. These hubs are arranged to be engaged by tong-type grippers from both the inside and outside of the truss or truss junction structure. As a consequence, the assembler trolley can function on either the inside or outside of the trusses or truss junctions. And, since the nodes are the strongest and most reinforced part of the structure, they provide ideal load distribution points for the assembler trolley support. The assembler trolley induces minimal kick moments into a node since a nearly coincident common point of intersection exists for all lines of force acting on the legs and hub of a node.

The assembler trolley comprises forward and rear crawlers joined by an articulated crawler coupler. Automatically focused TV cameras on the rear and forward crawlers monitor assembly operations. In the event of a malfunction, manually controlled backup operations may be carried out with the aid of these cameras by an onboard crew or ground-based control station.

The forward crawler carries prepackaged structural cargo in replaceable canisters and a plurality of manipulator arms. Each manipulator arm has shoulder azimuth, roll, and elevation drives. At its working end are two wrist drives; roll and pitch. The linear actuation between shoulder and wrist achieve changes in arm reach. All manipulator arms are releasable and removable by adjacent arms in the event of failure. Those on cooperating assembler trolleys are also programmed for mutual removal and replacement. The store of spare parts on the rear crawler of one assembler trolley may similarly be made accessible to the forward crawler of a companion assembler trolley.

An actuated dog with an integral backup disc is carried at the working end of the manipulator arm. This dog is used to grasp struts or nodes for removal from the cargo canisters and to release them when delivered and installed in their proper assembly positions. The dog is typically rotated in 90 degree increments to first engage and then disengage the strut or node, and where necessary detents may be provided to more positively engage the strut or node during manipulations.

Figure 77:
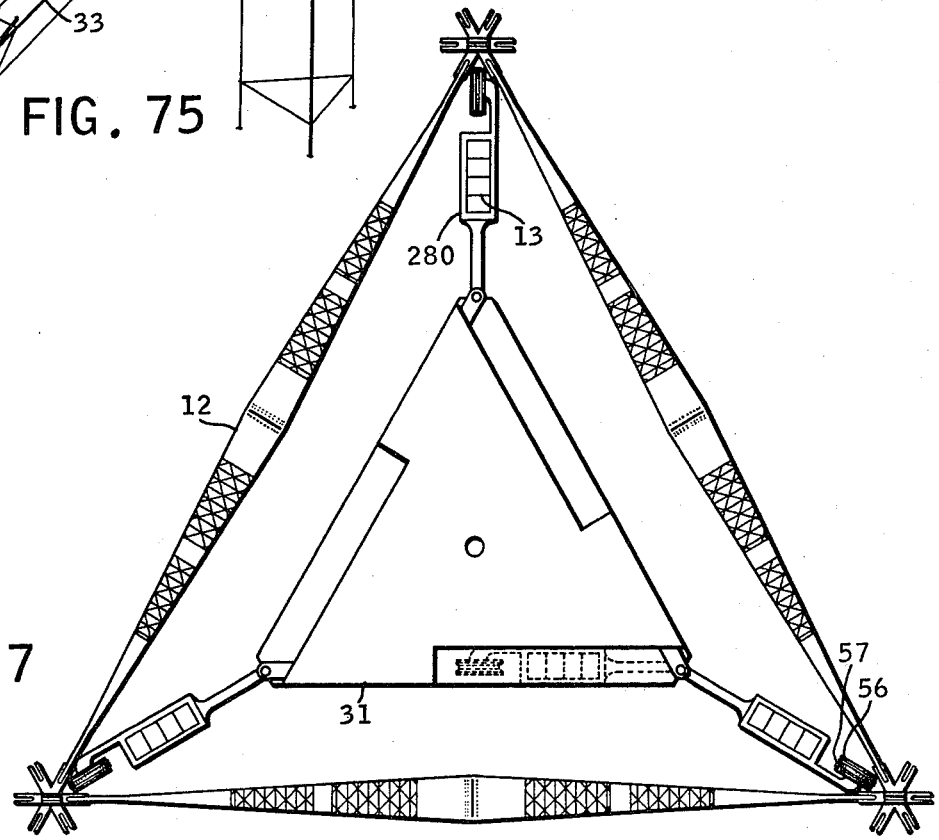
FIG. 77 is an end view of an alternate embodiment of the forward crawler located within the structural truss.

It should also be understood and apparent to those skilled in the art that other arrangements, modifications, and applications of the disclosed invention may be made that are within the spirit and scope of the invention. For example, the nodes may not be stored in the same canister 90 as the struts, but stored in separate node canisters 280 as shown in FIG. 77. The node canisters 280 are located adjacent to the transport belt 57 and are so disposed that the nodes 13 may be dispensed one at a time directly to the node grippers 60 by means of a lead screw and stack advance plate system similar to that utilized in the strut canister 90. Such an arrangement would eliminate the node removal function of the manipulator arms. For compactness the canisters 280, along with transport belts 57 and their pulleys 56 may be hinged to stow flush with the sides of the forward crawler 31, such as shown in the lower right hand corner of the crawler in FIG. 77.

Many structural arrangements other than those shown in FIGS. 1 through 4 may be constructed. For example, a platform structure, such as shown in FIGS. 78 through 80, may be assembled by the assembler trolley 30. This structure comprises a plurality of triangular trusses constructed side-by-side such that adjacent trusses have a common planar truss frame. The platform is constructed by the assembler trolley 30 traveling a serpentine path as it constructs each adjacent truss in a sequence shown in FIGS. 78 through 80.

In FIG. 78 the assembler trolley constructs three sides 281, 282 and 283 of a truss to the desired length using the method previously described. The rear crawler 32 is brought to a stop inside the completed truss such that the rear crawler is gripped to the end bay of the completed truss with the crawler coupler shaft 33 and forward crawler 31 extended beyond the truss. The two universal joints 36 and 42 (FIG. 29) of the crawler coupler shaft 33 are then each rotated 90 degrees in a plane normal to truss side 283 to bring the forward crawler 31 into a heading position 180 degrees to the rear crawler 32, thus essentially having completed a U-turn.

The forward crawler then begins construction of the two truss sides 285 and 286, as shown in FIG. 81, proceeding down this second truss by means of the extension of the forward shaft 54. After two bays of the second truss, comprising sides 283, 285 and 286, are completed the forward crawler 31 moves backward to the edge of this second truss. The rear crawler 32 then moves out of engagement with the first truss structure, whereupon the two universal joints 36 and 42 are each rotated 90 degrees to bring the rear crawler into longitudinal alignment with the forward crawler. The forward crawler then moves forward into the second truss and completes the assembly of the second truss.

When the second truss is completed, the forward crawler is then extended beyond the second truss and maneuvered into a U-turn in the manner previously described to start the assembly of the next two sides of the third truss.

Figure 82:
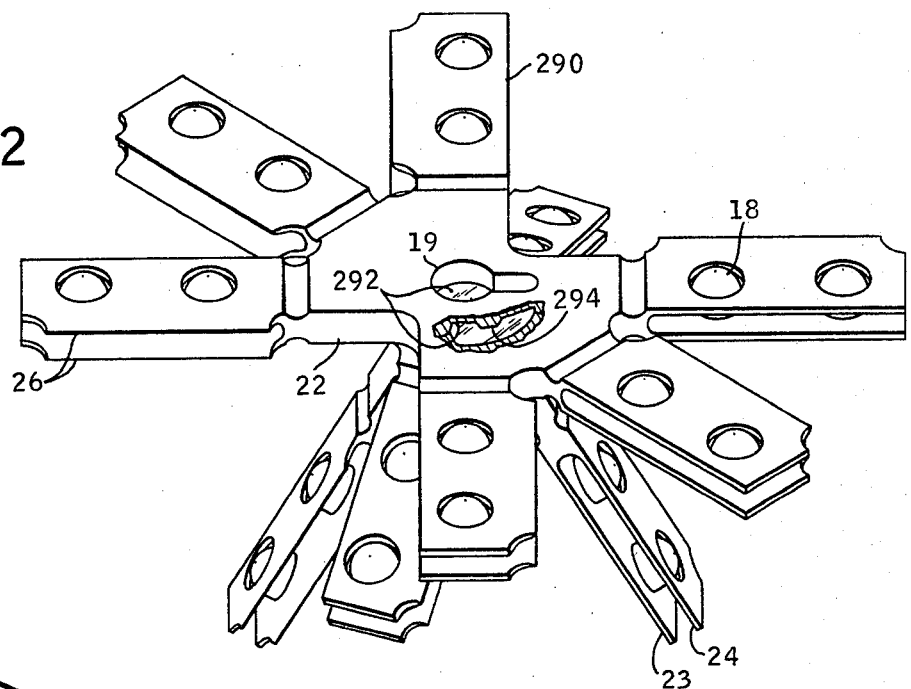
FIG. 82 is a perspective view of the structural node utilized in the structure shown in FIGS. 78 through 81.

The platform structure shown in FIGS. 78 through 80 would require a node having ten legs, which would serve the function of two six-leg nodes 13 placed side by side. The ten-leg node 290 is shown in FIG. 82, where it will be seen that the same shaped keyway 19 is located at the approximate center of the node hub. It will be observed however that because of the increased thickness of the node hub 22 the keyway 19 does not extend completely through the hub. A recess 292 is provided so that the hub thickness in the area of the keyway is the same thickness as the hub on six-leg nodes 13, thereby permitting engagement by the same dog-disc tool 226. In FIG. 82 is shown a cross-section of the recess 292 and a spring biased button 294 which serves to retain the dog when it is rotated in the recess. The button 294 must be overcome for both engagement and disengagement of the dog-disc tool with the node. This provides for positive engagement during node maneuvering by the manipulator arm. A simple dimple may also serve this detenting function, and similar detenting devices may be utilized on other nodes as well as the struts if such are necessary.

It is likewise apparent that other structural shapes such as square, T, L, Z, U and triangular may be utilized for the truss struts with good results. Fixed L and U shapes are particularly well suited for efficient stacking in a storage canister. Such struts are less stable and efficient than the expandable strut as a column or beam, but, while they must be heavier than the expandable strut for comparable performance, they are simpler to fabricate, stack, and deploy. Because no prestress must be contained in the stacked condition, the number of keyways or holddown points may be less for fixed struts than for the deployable strut.

Figure 83:
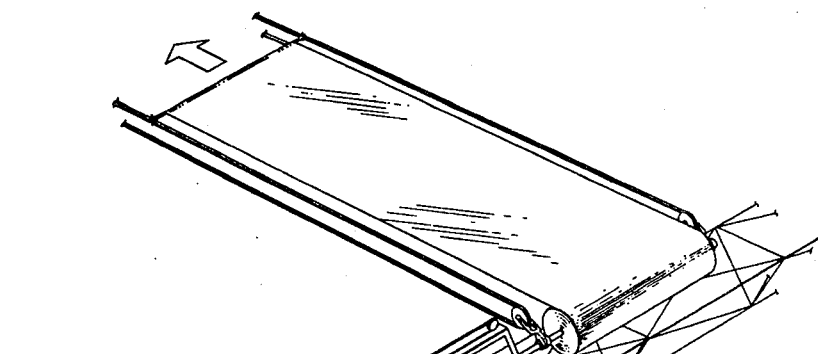
FIGS. 83 and 84 show a method of deploying a working surface on the completed truss structure.
Figure 84:
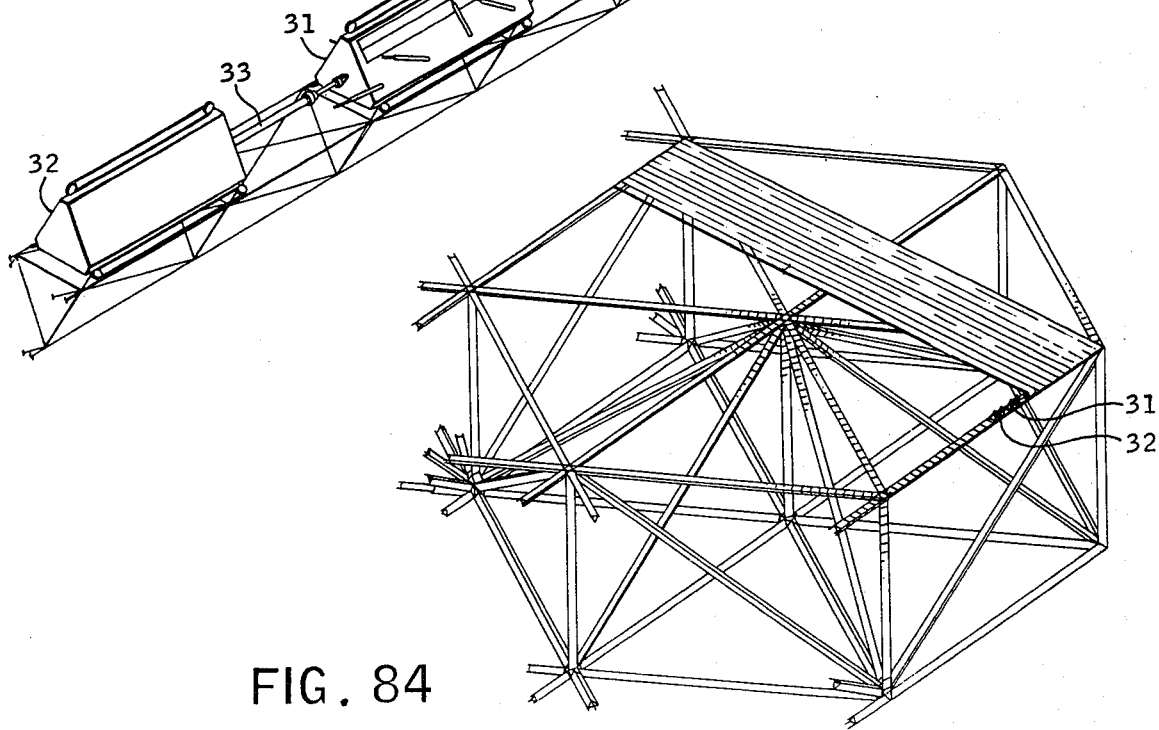

Upon completion of the structure the assembler trolley may serve as a transport and material handler by moving on the inside or outside of trusses. The trolley may also be used to install equipment on the structure. In FIGS. 83 and 84 the trolley is shown attaching a working surface to the structure as an example. The working surface could be, for example, a solar blanket, an aluminized plastic reflector, or a wire mesh microwave beam former and amplifier array. The trolley attaches clothes line type pulleys to one end of a structure, then maneuvers to an opposite end where it attaches the end of a roll of working surface to the clothes lines and drives the clothes line until the working surface is payed out. The working surface is then attached at each corner to a structural node utilizing the node keyway, or to special fittings attached to the structure for that purpose. The trolley then moves forward and the process is repeated. This process is particularly efficient where two trolleys are utilized, one at each end of the clothes line.

After the working surface has been installed the trolley has accessibility to the working surface from inside and outside contiguous trusses as well as from inside and outside of trusses which support it. This accessibility may be used to repair the working surface as well as install power and microwave connections and transmission lines and finally to assemble and hook up all onboard subsystems.

The previously described arrangements are by way of example to show that arrangements and applications of the invention, other than the preferred embodiment herein disclosed, will become apparent to those skilled in the art, and these along with other modifications and applications of the disclosed invention may be made by those skilled in the art without departing from the scope of the invention, the scope limited only by the claims.

I claim:

1. An assembler trolley for the construction of a structure comprising:

a forward crawler;

a rear crawler;

a crawler coupler, said coupler telescopically connected between said forward crawler and said rear crawler;

a plurality of transport belts mounted on each of said crawlers;

gripping means mounted on said transport belts for gripping said structure; and manipulator arms disposed on at least one of said crawlers for maneuvering elements of said structure.

2. The assembler trolley of claim 1 wherein said crawler coupler comprises;

a first controlled movement universal joint;

an outer tube having a fixed end and an open end, said outer tube connected at said fixed end to said first universal joint;

an inner tube disposed within said outer tube and having an external end extending beyond said open end of said outer tube for telescopic movement within said outer tube;

a second controlled movement universal joint connected to said external end of said inner tube; and a forward tube connected at one end to said second universal joint.

3. The assembler trolley of claim 2 wherein said crawler coupler further comprises:

a first driving means for rotating said first controlled movement universal joint about an azimuth axis;

a second driving means for rotating said outer tube about an elevation axis of said first controlled movement universal joint;

a gear rack disposed along substantially the full length of said inner tube;

a pinion gear rotatably mounted to said outer tube and meshed with said gear rack;

a third driving means for rotating said second controlled movement universal joint about an azimuth axis; and a fourth driving means for rotating said inner tube about an elevation axis of said second controlled movement universal joint.

4. The assembler trolley of claim 3 wherein said crawler coupler further comprises:

a keying means for preventing torsional rotation of said inner tube around the longitudinal axis of said inner tube relative to said outer tube; and rotary means for torsional rotation of said forward tube around the longitudinal axis of said forward tube relative to said inner tube.

5. The assembler trolley of claim 1 wherein each of said transport belts comprises:

a pair of pulleys, one pulley mounted at each end of said crawler;

a runaround belt passing around said pair of pulleys; and a driving means for rotating at least one of said pulleys.

6. The assembler trolley of claim 1 wherein each of said gripping means comprises:

a spreader bar juxtapositioned parallel to said belt;

two gripper jaws, one gripper jaw pivotally attached near each end of said spreader bar; and means for opening and closing said gripper jaws.

7. The assembler trolley of claim 1 wherein each of said manipulator arms comprises:

a sleeve having a proximal shoulder end and a distal free end;

an arm slideably mounted within said sleeve for telescopic movement therein, said arm having a working end extending beyond said free end of said sleeve;

a dog-disc tool rotatably mounted to said working end of said arm;

a first means for rotating said dog-disc tool around the longitudinal roll axis of said dog-disc tool;

a second means for rotating said dog-disc tool around a pitch axis perpendicular to said dog-disc tool longitudinal roll axis;

a third means for rotating said dog-disc tool around the longitudinal axis of said arm; and a shoulder fitting attached to said shoulder end of said sleeve to provide pivotal support of said sleeve for rotation about azimuth and elevation axes.

8. An assembler crawler for transporting and manipulating structural elements comprising:

a crawler body structure;

a plurality of transport belts mounted on said body structure;

gripping means mounted on said transport belts for gripping at least some of said structural elements; and a plurality of manipulator arms disposed on at least one side of said body structure.

9. The assembler crawler of claim 8 wherein said body structure is shaped to define a plurality of canister storage compartments located substantially within said body structure.

10. The assembler crawler of claim 9 wherein said body structure is further adapted to define a coupler rod support compartment located substantially along the longitudinal axis of said body structure.

11. The assembler crawler of claim 8 wherein each of said transport belts comprises:

a pair of pulleys, one pulley mounted at each end of said crawler;

a runaround belt passing around said pair of pulleys; and a driving means for rotating at least one of said pulleys.

12. The assembler crawler of claim 11 wherein said runaround belt is adapted to form a plurality of gear teeth disposed along an inner surface of said runaround belt, and at least one of said pulleys is adapted to form a plurality of gear teeth disposed around said pulley for meshing with said runaround belt gear teeth.

13. The assembler crawler of claim 8 wherein each of said gripping means comprises:

an actuator guide fixedly attached to said transport belt;

a spreader bar juxtapositioned parallel to said belt;

two gripper jaws, one gripper jaw pivotally attached near each end of said spreader bar; and an actuator rod slideably mounted within said actuator guide for opening and closing said gripper jaws.

14. The assembler crawler of claim 8 wherein each of said manipulator arms comprises:

a sleeve having a proximal shoulder end and a distal free end;

an arm slideably mounted within said sleeve for telescopic movement therein, said arm having a working end extending beyond said free end of said sleeve;

a dog-disc tool rotatably mounted to said working end of said arm;

a shoulder fitting attached to said shoulder end of said sleeve to provide pivotal support of said sleeve for rotation about azimuth and elevation axes.

15. The assembler crawler of claim 14 wherein said shoulder fitting is adapted to further provide axial support of said sleeve for rotation about a roll axis.

16. A manipulator arm for maneuvering structural elements comprising: a sleeve having a proximal shoulder end and a distal free end; an arm slideably mounted within said sleeve for telescopic movement therein, said arm having a working end extending beyond said free end of said sleeve; a gear rack disposed along substantially the full length of said arm; a first pinion gear rotatably mounted on said sleeve and meshed with said gear rack; a dog-disc tool rotatably mounted to said working end of said arm; a shoulder fitting pivotally attached to said shoulder end of said sleeve to permit said sleeve to rotate about an elevation axis; a clevis fitting rotatably mounted to said working end of said arm for rotation about the longitudinal axis of said arm; a wrist block shaped to form trunnions that rotatably mount within said clevis fitting for rotation about an axis perpendicular to said arm's longitudinal axis; and wherein said dog-disc tool is rotatably mounted within said wrist block for rotation about an axis perpendicular to said wrist block trunnions.

17. A manipulator arm comprising:

a sleeve having a proximal shoulder end and a distal free end;

an arm slideably mounted within said sleeve for telescopic movement therein, said arm having a base end located within said sleeve and an opposite working end extended beyond said free end of said sleeve;

a first runaround belt disposed within said sleeve and connected to said arm at a point near said base end of said arm for moving said arm telescopically within said sleeve;

a wrist fitting rotatably mounted to said working end of said arm for rotation about a pitch axis perpendicular to the longitudinal axis of said arm;

a dog-disc tool rotatably mounted to said wrist fitting for rotation about a roll axis perpendicular to said wrist fitting pitch axis;

a shoulder fitting journaled to said shoulder end of said sleeve to provide cantilever support for said sleeve and permit said sleeve to roll about the longitudinal axis of said sleeve;

a shoulder trunnion support fitting rotatably mounted to said shoulder fitting to permit said sleeve to rotate about an elevation axis perpendicular to said sleeve longitudinal axis; and means for rotating said shoulder trunnion support fitting about an aximuth axis perpendicular to said elevation axis.

18. The manipulator arm of claim 17 further comprising:

a first drive pulley rotatably mounted within said sleeve at said shoulder end of said sleeve;

a first idler pulley rotatably mounted within said sleeve at said free end of said sleeve;

a second runaround belt disposed within said sleeve and passing around said first drive pulley and said first idler pulley to define a driving side and a return side of said second runaround belt;

a first transfer pulley rotatably mounted to said arm and disposed between said arm and said sleeve for engagement with said driving side of said second runaround belt;

a second transfer pulley fixedly connected to said first transfer pulley for mutual rotation, said second transfer pulley disposed within said arm;

a wrist pitch pulley fixedly attached to said wrist fitting for mutual rotation; and a third runaround belt disposed within said arm and passing around said wrist pitch pulley and said second transfer pulley.

19. The manipulator arm of claim 18 further comprising:

a first bevel gear fixedly attached to the end of said dog-disc tool;

a wrist roll pulley journalled within said wrist fitting and disposed in said arm;

a second bevel gear fixedly attached to said wrist roll pulley for mutual rotation, said second bevel gear meshed with said first bevel gear;

a third transfer pulley rotatably mounted to said arm and disposed within said arm;

a fourth runaround belt disposed within said arm and passing around said third transfer pulley and said wrist roll pulley:

a second drive pulley rotatably mounted within said sleeve near said shoulder end of said sleeve;

a second idler pulley rotatably mounted within said sleeve near said free end of said sleeve;

a fifth runaround belt disposed within said sleeve and passing around said second drive pulley and said second idler pulley to define a driving side and a return side of said fifth runaround belt; and a fourth transfer pulley fixedly connected to said third transfer pulley for mutual rotation, said fourth transfer pulley disposed within said sleeve for engagement with said driving side of said fifth runaround belt.

* * * * *